United States Patent [19]

Kato et al.

[11] Patent Number: 5,543,843
[45] Date of Patent: Aug. 6, 1996

[54] COMMUNICATION JACK NOSE CLEANING TOOL

[75] Inventors: Motoki Kato; Yoichi Yagasaki; Jun Yonemitsu, all of Kanagawa, Japan

[73] Assignee: Sony Corporation, Tokyo, Japan

[21] Appl. No.: 984,416

[22] PCT Filed: Jul. 16, 1992

[86] PCT No.: PCT/JP92/00910

§ 371 Date: Apr. 19, 1993

§ 102(e) Date: Apr. 19, 1993

[87] PCT Pub. No.: WO93/02528

PCT Pub. Date: Feb. 4, 1993

[30] Foreign Application Priority Data

Jul. 19, 1991 [JP] Japan ..................... 3-179838
Jan. 27, 1992 [JP] Japan ..................... 4-012448

[51] Int. Cl.$^6$ ..................... H04N 7/30
[52] U.S. Cl. ................ 348/400; 348/401; 348/405; 348/421
[58] Field of Search ............. 348/400, 401, 348/409, 405, 408, 415, 414, 417, 418, 421, 422; H04N 7/133, 7/137

[56] References Cited

U.S. PATENT DOCUMENTS

| | | | |
|---|---|---|---|
| 4,710,812 | 12/1987 | Murakami et al. | 348/417 |
| 4,754,336 | 6/1988 | Nishizsawa . | |
| 4,862,261 | 8/1989 | Tanaka | 348/422 |
| 4,878,230 | 10/1989 | Murakami et al. | 348/417 |
| 5,010,401 | 4/1991 | Murakami et al. | 348/417 |
| 5,128,756 | 7/1992 | Johnston et al. | 348/417 |
| 5,136,371 | 8/1992 | Savatier et al. | 348/409 |
| 5,144,428 | 9/1992 | Okuda et al. | 348/409 |
| 5,172,228 | 12/1992 | Israelsen | 348/422 |
| 5,191,414 | 3/1993 | Sugiyama | 348/409 |
| 5,241,383 | 8/1993 | Chen et al. | 348/409 |
| 5,251,028 | 10/1993 | Iu | 348/400 |
| 5,337,087 | 8/1994 | Mishima | 348/405 |
| 5,410,350 | 4/1995 | Kato et al. | 348/400 |
| 5,410,351 | 4/1995 | Kojima | 348/410 |

FOREIGN PATENT DOCUMENTS

| | | |
|---|---|---|
| 2-134910 | 5/1990 | Japan . |
| 4-213987 | 8/1992 | Japan . |

OTHER PUBLICATIONS

IEEE Communications Magazine vol. 28, No. 11, Nov. 1990, Piscataway, NJ US pp. 24–32 A. Wong et al. 'MCPIC: A Video Coding Algorithm for Transmission and Storage Applications'.

(List continued on next page.)

Primary Examiner—Tommy P. Chin
Assistant Examiner—Richard Lee
Attorney, Agent, or Firm—William S. Frommer; Alvin Sinderbrand

[57] ABSTRACT

In a method of compressing a motion picture signal divided into blocks of picture data and in which each of the blocks is selectively compressed by discrete cosine transform (DCT) coding or by intra-block predictive coding which effects non-transform coding (NTC); the intra-block predictive coding is effected by calculating a mean value of the picture data in a flat region of each block, determining a representation value of each block on the basis of the mean value thereof, determining the differences between the representation value for each block and the values of the pixels of picture data in the respective block, quantizing the resulting difference values with a selected quantizing width for generating quantizing coefficients, and variable length coding such quantizing coefficients for each block, the representation value of the respective block and the respective quantizing width. In decoding a bit stream of coded motion picture data, the bit stream is variable length decoded to generate the quantization coefficients for each block, the representation value determined on the basis of the mean value of a flat region in the respective block and information as to the quantizing width for the respective block, and then the generated quantization coefficients are decoded on the basis of the generated representation value and the information as to the quantizing width.

5 Claims, 29 Drawing Sheets

OTHER PUBLICATIONS

Le Techniques de l'Ingenieur–Partie E5500 Jun. 1986, Paris pp. 1–11 C. J. Richards 'Compression du signal video'.
Patent Abstracts of Japan, vol. 014, No. 312 (E–0948) 5 Jul. 1990 & JP–A–21–00 486 (Canon Inc) 12 Apr. 1990.
Patent Abstracts of Japan, vol. 013, No. 404 (E–817) 7 Sep. 1989 & JP–A–11 44 874 (Canon Inc) 7 Jun. 1989.
Patent Abstracts of Japan, vol. 011, No. 055 (E–481) 20 Feb. 1987 (JP–A–61 214 882 (NEC) 24 Sep., 1986.

Yoshiyuki Yashima and Katsutoshi Sawada, "Adaptive Intraframe/Interframe Coding for HDTV Signals by Using Extrapolative and Interpolative Prediction", the Transactions of the Institute of Electronics and Communications Engineers, Japan Section, '87/1, vol. J70–B, No. 1, pp. 96–104 (no translation).

Tetsujiro Kondo and Hideo Nakaya, "A New ADRC Quantizer", the Proceedings of the 4th Picture Coding Symposium of Japan (PCS,J89), pp. 65–66 (no translation).

| 100 | 90 | 80 | 70 | 60 | 50 | 40 | 30 |
|---|---|---|---|---|---|---|---|
| 90 | 80 | 70 | 60 | 50 | 40 | 30 | 40 |
| 80 | 70 | 60 | 50 | 40 | 30 | 40 | 50 |
| 70 | 60 | 50 | 40 | 30 | 40 | 50 | 60 |
| 60 | 50 | 40 | 30 | 40 | 50 | 60 | 70 |
| 50 | 40 | 30 | 40 | 50 | 60 | 70 | 80 |
| 40 | 30 | 40 | 50 | 60 | 70 | 80 | 90 |
| 30 | 40 | 50 | 60 | 70 | 80 | 90 | 100 |

K1 ORIGINAL PICTURE

↓ DCT ↓

| 450 | 0 | 45 | 0 | 10 | 0 | 3 | 0 |
|---|---|---|---|---|---|---|---|
| 0 | 131 | 0 | 0 | 0 | 0 | 0 | 0 |
| 45 | 0 | -34 | 0 | 0 | 0 | 0 | 0 |
| 0 | 0 | 0 | 16 | 0 | 0 | 0 | 0 |
| 10 | 0 | 0 | 0 | -10 | 0 | 0 | 0 |
| 0 | 0 | 0 | 0 | 0 | 7 | 0 | 0 |
| 3 | 0 | 0 | 0 | 0 | 0 | -6 | 0 |
| 0 | 0 | 0 | 0 | 0 | 0 | 0 | 5 |

K2 TRANSFORMED PICTURE

↓ QUANTIZING ↓

K3 QUANTIZED PICTURE

| 45 | 0 | 4 | 0 | 0 | 0 | 0 | 0 |
|---|---|---|---|---|---|---|---|
| 0 | 13 | 0 | 0 | 0 | 0 | 0 | 0 |
| 4 | 0 | -3 | 0 | 0 | 0 | 0 | 0 |
| 0 | 0 | 0 | 1 | 0 | 0 | 0 | 0 |
| 0 | 0 | 0 | 0 | -1 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

K4 PROCEDURE OF CALL-OUT OF COEFFICIENTS

FIG. 3

K5 PROCEDURE OF CALL-OUT
OF COEFFICIENTS

PROCEDURE OF CALL-OUT
OF COEFFICIENTS

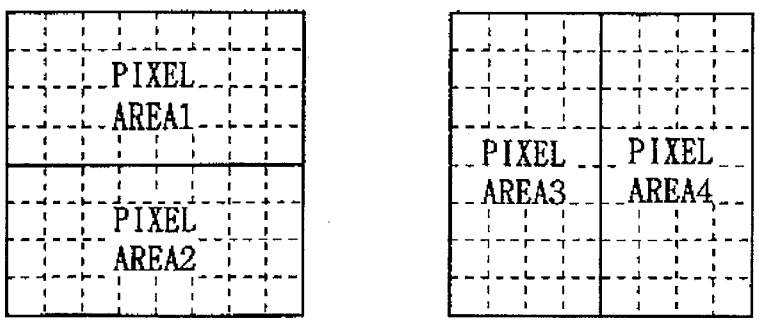

FIG. 15A (a) definition of areas, PIXEL_AREA 1~4.
DATA SCAN PATH selector caluculates the following variables.
Variable sum_abs_event[0] is the summation of absolute quantized pixels in PIXES_AREA1.
And sum_abs_event[1]sum_abs_event[2], and sum_abs_event[3] are the summation of absolute quantized pixels in PIXEL_AREA2, PIXEL_AREA3, and PIXEL_AREA4 respectively.

```
max=0;
for(n=0;n<4;n++)
   if(sum_abs_event[n]>max)
      max=sum_abs_event[n];
      concentrate_event_area=n;
   }
}
if(concentrate_event_area==0)
  DATA SCAN PATH is No.1.
else if(concentrate_even_area==1)
  DATA SCAN PATH is No.2.
else if(concentrate_even_area==2)
  DATA SCAN PATH is No.3.
else if(concentrate_even_area==3)
  DATA SCAN PATH is No.4.
```

(b) definition of selection of data path.

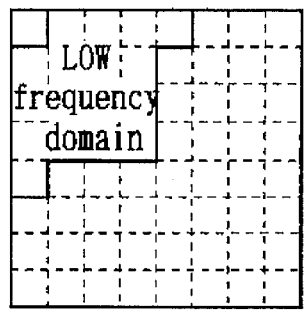

8×8 block dct coeficients.
(a) definition of LOW FREQUENCY DOMAIN.

```
#define BLOCKSIZE 64
int coef[64]; /* dct coefficients of the current coding block. */
int MASK[64]={0,1,1,1,1,0,0,0,
              1,1,1,1,0,0,0,0,
              1,1,1,1,0,0,0,0,
              1,1,1,1,0,0,0,0,
              1,0,0,0,0,0,0,0,
              0,0,0,0,0,0,0,0,
              0,0,0,0,0,0,0,0,
              0,0,0,0,0,0,0,0,};

for(i=0;i<BLOCKSIZE;i++){
   low[i]=coef[i]*MASK[i];
}
for(i=1;i<BLOCKSIZE;i++)
   low_ac_power+=low[i]*low[i];
   all_ac_power+=coef[i]*coef[i];
} if(low_ac_power/17≦LITTLE AC THRESHOLD ||
   low_ac_power/all_ac_power≦AC_CONCENTRATE_THRESHOLD)
   return(apply_DCT);
}

※LITTLE_AC_THRESHOLD=64;
  AC_CONCENTRATE_THRESHOLD=0.95;
  these values under study.
```

(b) algorithm of checking dct coefficients activity.

FIG. 21B

8×8 block pixels.   ■:area of pixels for   pixel order
x[64]=[x0....x63];   estimation of base.   in area ■

FIG. 22A   FIG. 22B   FIG. 22C pick out pixels in area ■ accoding to the order
shown in Figure 22C.

t[35]=[x0,x1,x2,x3,x4,x5,x6,x7,x15,x23,x31,x39,x47,x55,x63,
    x62,x61,x60,x59,x58,x57,x56,x48,x40,x32,x24,x16,
    x8,x0,x1,x2,x3,x4,x5,x6];

pixels for estimation of base.

FIG. 23B (a) mean[ ] and sum_abs_diff[ ]

8×8 block pixels

The case of basel i = No.25

■ : area of pixels using calculation of base1=mean[25].

□ : area of pixels using selection of base2.
  i.e. base2 is selected from {mean[i]:$8 \leq i \leq 14$}.

FIG. 23D (b) An example of calculation of base2.

```
#define  N_PIXEL_oneAREA 8
#define  N_AREA 28
#define  N_DIFF_oneAREA 7 /*(N_PIXEL_oneAREA-1)*/
define  N_SELECT_PIXEL 35 int  abs_diff[N_SELECT_PIXEL-1];
int  mean[N_AREA*2],sum_abs_diff[N_AREA*2];

/*---------------------------------
   calculation mean[], sum_abs_diff[]
---------------------------------*/
for(i=0;i<N_SELECT_PIXEL-1;i++){
   abs_diff[i]=abs(t[i+1]-t[i]);
} for(i=0;i<N_DIFF_oneAREA;i++){
  diff_buff += abs_diff[i];
} sum_abs_diff[0]=diff_buff;

for(i=0;i<N_PIXEL_oneAREA;i++){
   sum_buff += t[i];
}
mean[0]= (double)sum_buff/N_PIXEL_oneAREA;

for(i=1;i<N_AREA;i++){
   diff_buff=diff_buff-abs_diff[i-1]+abs_diff[i+N_DIFF_oneAREA-1];
   sum_abs_diff[i]=diff_buff;

sum_buff =sum_buff-t[i-1]+t[i+N_PIXEL_oneAREA-1];
   mean[i]= (double)sum_buff/N_PIXEL_oneAREA;
}

/*--------------------
   APPEND data
------------------*/
for(i=N_AREA;i<N_AREA*2;i++){
   mean[i]    =mean[i-N_AREA];
   sum_abs_diff[i]=sum_abs_diff[i-N_AREA];
}
```

FIG. 24

```
/*------------------
    search BASE1
  -----------------*/
mintmp=9999;
  for(i=0;i<N_AREA;i++){
    if(sum_abs_diff[i]<mintmp){
      mintmp=sum_abs_diff[i];
      base1_i=i;
    }
  }
base1=mean[base1_i];
sum_abs_diff1 =sum_abs_diff[base1_i];

/*------------------
    search BASE2
  -----------------*/
START_ADDRESS_SEARCH_BASE2 =base1_i+11;
END_ADDRESS_SEARCH BASE2   =START_ADDRESS_SEARCH_BASE2+6;

mintmp=99999;
for(i=START_ADDRESS_SEARCH_BASE2;
    i<END_ADDRESS_SEARCH_BASE2+1;
    i++){
   if(sum_abs_diff[i]<mintmp){
      mintmp=sum_abs_diff[i];
      base2_i=1;
    }
}
base2=mean[base2_i];
sum_abs_diff2 =sum_abs_diff[base2_i];
```

FIG. 25

```
/*-------------------
    get peak
-------------------*/
if (base1-min >max-base1){
  peak=base1-min;}
else{
  peak=max-base1;}

/*---------------------------
    Is peak BIG or not??
---------------------------*/
if(peak<PEAK_THRESHOLD)
  return(APPLY_DCT); /*--not Edge block--*/

/*---------------------------
    Is base1 VALID or not??
---------------------------*/
if(sum_abs_diff1 > FLAT_SAD_THRESHOLD){
  return(APPLY_DCT);
  /*--because BASE1 is INVALID--*/
}

/*---------------------------
    Is base2 VALID or not??
    Is base1 nearly equal base2??
---------------------------*/
if((sum_abs_diff2 > FLAT_SAD_THRESHOLD) ||
   (abs(base1-base2) <= DIFF_BASE_THRESHOLD)){
  base2_valid_or_not=BASE_INVALID;
}
else{
  base2_valid_or_not=BASE_VALID;
}

/*-------------------------------------
    if INTRA_CODED_MB and base2 is valid,
    is it possible NTC??
-------------------------------------*/
if(NB_MODE_INTRA && base2_valid_or_not=BASE_VALID){
  if(given_q*3 - abs(base1-base2) > BASE_DISTANCE_ERR){
    /* given_q: given quantize scale by rate control */
    return(APPLY_DCT);
  }
}
```

FIG. 26

```
/*-----------------------------
    Counting flat area pixels.
 ---------------------------*/
count_base1_pixel=0;
count_base2_pixel=0;
count_flat_area_pixel=0;
count_base1_pixel
    =get_count_flat_area_pixel(X,base1,
                               DIFF_BASE_THRESHOLD);
    /* X[]:pixels of curreat coding block */
count_flat_area_pixel=count_base1_pixel;

if(base2_valid_or_not==BASE_VALID){
  count_base2_pixel
      =get_count_flat_area_pixel(X,base2,
                                 DIFF_BASE_THRESHOLD);
  count_flat_area_pixel+=count_base2_pixel;
}

/*-----------------------------
    Is flat area LARGE??
 ---------------------------*/
if(count_flat_area_pixel<COUNT_FLAT_PIXEL_THRESHOLD){
  return(APPLY_DCT);
  /*because flat area is little. */
}
/*-----------------------------
    Does base2 swap for base1??
 ---------------------------*/
if(base2_valid_or_not==BASE_VALID){
  if(count_base1_pixel < count_base2_pixel){
    int  swap;
    swap=base1;
    base1=base2;
    base2=swap;
  }
}
```

FIG. 27

```
/*--------------------------
    if NON_INTRA_CODED_MB,
    base1 must be ZERO.
  --------------------------*/
if(NON_INTRA_CODED_MB){
  if(abs(base1)>DIFF_BASE_THRESHOLD){
    return(APPLY_DCT);
  }
  else{
    base1=0;
    if (abs(min) > abs(max)){
      peak= abs(min);}
    else{
      peak= abs(max);}
    }
}
/*--------------------------
    COUNT FLAT AREA PIXELS
  --------------------------*/
int get_count_flat_area_pixel(pixel,base,
                                       diff_base_threshold)
     int *pixel;
     int base,diff_base_threshold;
{
  int i, count=0;
  for(i=0;i<64;i++){
    if(abs(pixel[i]-base)<=diff_base_threshold)
      count++;
    }
  }
  return(count);
}
```

| Y00 | Y01 | Y10 | Y11 |
|-----|-----|-----|-----|
| Y02 | Y03 | Y12 | Y13 |

| Y00 | Y01 | Y10 | Y11 |
|-----|-----|-----|-----|
| Y02 | Y03 | Y12 | Y13 |

COMMUNICATION JACK NOSE CLEANING TOOL

TECHNICAL FIELD

This invention relates to a motion picture encoding and decoding system, and more particularly to a system, which permits transmission of motion picture signal by compressing the same.

BACKGROUND ART

As typical motion picture encoding system, there are those of two-dimensional discrete cosine transform (DCT) coding method and predictive coding method.

In the discrete cosine transform (DCT) coding method, signal power is concentrated in predetermined frequency components making use of the fact that picture signal has two-dimensional correlative a property. The resultant distribution of signal power frequency components is coded by expressing information to be transmitted with coefficients, and in this way frequency of information can be compressed.

For example, with a flat pattern portion, in which the motion picture signal is highly self-correlative, the discrete cosine transform coefficients (DCT coefficients) are distributed such that they are concentrated in low frequency components. Thus, in this case information to be transmitted can be expressed by merely coding the coefficients distributed such as to be concentrated in a low frequency region, thus permitting compression of information.

With the discrete cosine transform method, however, if discontinuous points of such signal as picture signal including contours (or edges) are to be transmitted by accurately expressing them with DCT coefficients, the generated DCT coefficients are distributed broadly from low to high frequency components. Therefore, an extremely large number of coefficients are required, thus-reducing the coding efficiency.

To solve this problem, a method of coarsening the coefficient quantizing characteristic or discarding high frequency component coefficients has been used for high compression coding motion pictures. These measures, however, are still insufficient in that the motion picture signal is deteriorated pronouncedly. For example, a distortion like a waver (which is called corona effect mosquito noise) is generated around the contour.

The predictive coding method, on the other hand, makes use, for coarsening the quantizing characteristic, of the eye's character that the brightness discrimination degree is low for contour portions of motion picture, and it has an advantage that it permits comparatively high compression coding. In this method, however, coarsening the quantizing characteristic for flat portions of motion picture, is liable to result in visually pronounced deterioration, such as generation of false contours or particle-like noises. Therefore, the predictive coding is not suited as means for high compression coding of flat portions.

Accordingly, it has been contemplated to let the discrete cosine transform (DCT) and predictive coding methods mutually make up for their drawbacks, that is, to switch the discrete cosine transform (DCT) and intra-block predictive or non-transform coding methods for each unit block according to the character of the pattern for high compression coding. More specifically, the discrete cosine transform (DCT) method may be used for a flat block of picture, while using the intra-block predictive coding (or NTC, the intra-block non-transform coding) for a contour portion of picture.

In the block-by-block intra-block predictive coding (NTC), there is a problem of block distortion which is generated when the quantizing is made coarsely. Specifically, this is a mosaic-like phenomenon produced for each block as a result of the coding.

In the intra-block predictive coding (NTC), quantizing errors generated as a result of coarse quantizing directly appear as brightness level changes (or deterioration). If great brightness level changes appear along the boundary between adjacent blocks, the shape of the blocks is pronounced visually like a mosaic.

DISCLOSURE OF INVENTION

In view of the foregoing, an object of this invention is to provide a motion picture coding and decoding system, which permits block-by-block transmission of compression coded data of motion pictures without causing block distortion of decoded motion pictures.

The foregoing objects and other objects of the invention have been achieved by the provision of the motion picture encoding and decoding apparatus wherein: when coding a frame of motion picture by dividing the frame into a plurality of blocks for block-by-block coding, the discrete cosine transform coding and intra-block predictive coding are adaptively switched according to the character of the pattern.

The discrete cosine transform (DCT) coding system is firstly used for flat portions of the motion picture. At this time, even by effecting coarse quantizing with the DCT coding method, it is possible to obtain for the decoded motion picture a smoothness corresponding to the accuracy of calculation at the time of the discrete cosine transform. The intra-block predictive coding (NTC) method is secondly used for contour portions of the motion picture. At this time, for reducing block distortion resulting from coarse quantizing, adaptive quantizing is effected by transmitting data of a typical value BASE1 of the block and the quantizing width Q, or the typical value BASE1 of the block, the difference D between the typical value BASE1 and another typical value BASE2 and the quantizing width Q. In the decoding system, the picture is decoded by using the typical value BASE1 of the block and quantizing width Q or the typical value BASE1 of the block, the difference D and quantizing width Q along with switching information.

In the motion picture coding apparatus according to the invention, in which intra- and inter-picture coding modes are used, the coding mode is switched to the DCT or intra-block predictive coding mode for each unit area (or block) of intra- or inter-picture signal.

Switching between the discrete cosine transform (DCT) coding and intra-block predictive coding (NTC) is thus permitted by providing the convention motion picture coding method, which has the function of discrete cosine transform (DCT) coding alone, a switching information flag specifying either DCT or NTC for each block to be coded or providing a NTC mode by expanding specifying information specifying a mode of the unit area (or macro-block) coding.

In this way, it is possible to obtain higher efficiency coding of motion picture and also decoding to reproduce higher picture quality motion picture according to the high efficiency coded data.

As above, according to the invention the intra-block predictive coding is selected for the coding of the contour portion of pictures, so that coding with less mosquito noise or like interference can be obtained with substantially the same or less amount of information as that in the case of the discrete cosine transform coding, and high picture quality can be obtained with less amount of information as a whole compared to the system having only the discrete cosine transform coding function.

Further, when effecting the intra-block predictive coding, the block distortion of the decoded picture can be reduced by effecting adaptive quantizing by transmitting a typical value of the block and quantizing width or a typical value BASE1 of the block, the difference between the typical value BASE1 and another typical value BASE2 of block and the quantizing width.

It is possible to further increase the coding efficiency by adaptively switching the order of call-out of coefficients after the quantizing and, if necessary, further carrying out a coefficient differentiation process.

BRIEF DESCRIPTION OF DRAWINGS

FIG. 3 is a schematic view showing the procedure of coding DCT coefficients;

FIG. 15 is an algorithm in an example of selection of data scan path used for NTC;

FIG. 21 is an algorithm in an example of DCT coefficient concentration degree calculation;

FIG. 24 is an algorithm in the definition of a DCT/NTC judgment method with C language;

FIG. 25 is an algorithm subsequent to the view of FIG. 24, showing the algorithm in the definition of the DCT/NTC judgment method with C language;

FIG. 26 is an algorithm subsequent to the view of FIG. 25, showing the algorithm in the definition of the DCT/NTC judgment method with C language;

FIG. 27 is an algorithm subsequent to the view of FIG. 26, showing the algorithm in the definition of the DCT/NTC judgment method with C language;

FIG. 28 is an algorithm subsequent to the view of FIG. 27, showing the algorithm in the definition of the DCT/NTC judgment method with C language;

FIG. 30 is a schematic view showing an example of the transmission of DCT/NTC switching information;

FIG. 31 is a schematic view showing an example of the transmission of intra-block typical value.

BEST MODE FOR CARRYING OUT THE INVENTION

Preferred embodiments of this invention will be described with reference to the accompanying drawings:

(1) General Construction

Figure 1:
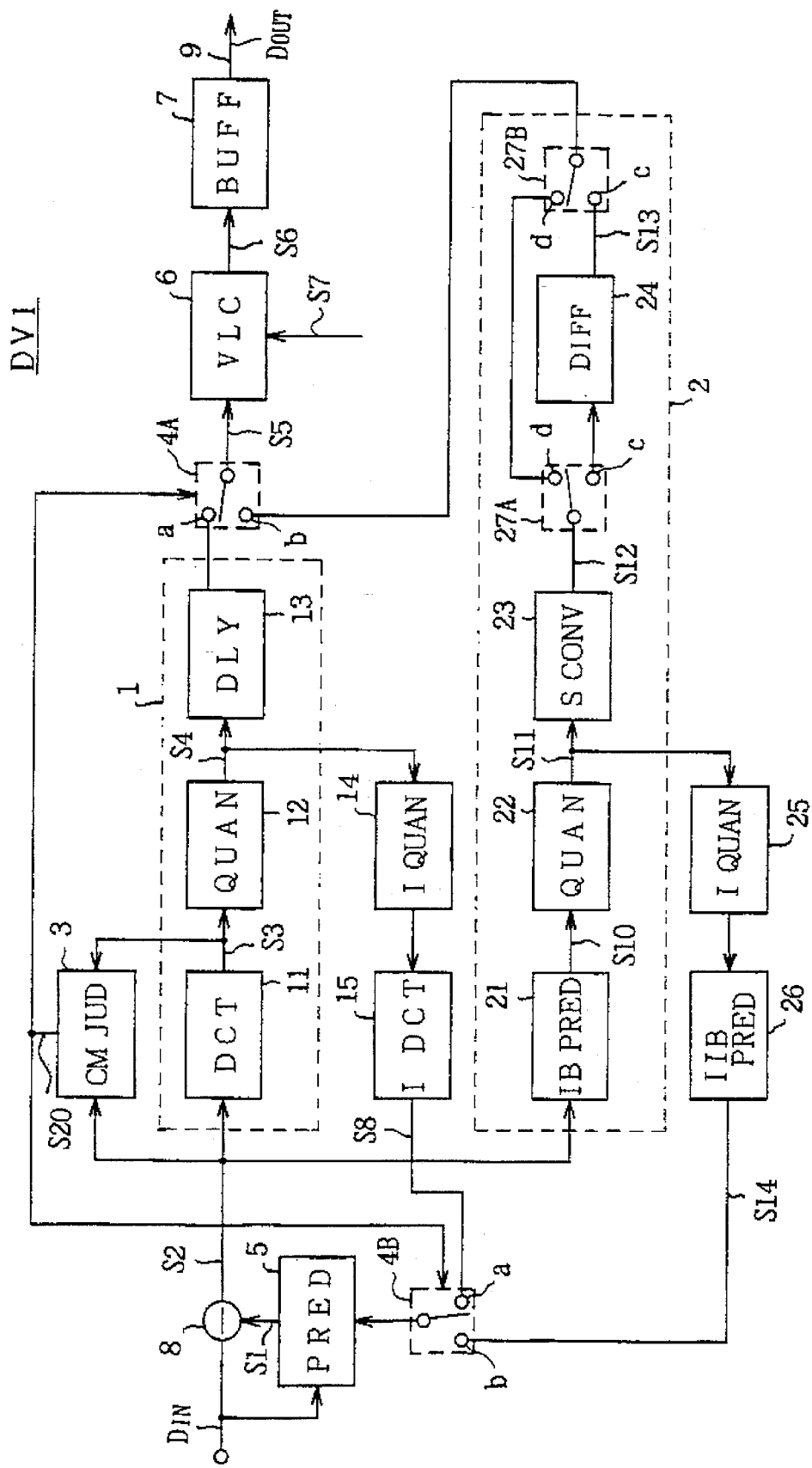
FIG. 1 is a block diagram showing one embodiment of an encoder according to the invention.

Referring to FIG. 1, DV1 generally designates an encoding system. A digital input motion picture signal is blocked by a blocking circuit (not shown) into blocks each consisting of, for instance, 8 by 8 pixels to be input as block digital input picture signal $D_{IN}$, which is processed through a discrete cosine transform (DCT) coding unit 1, an intra-block predictive coding (NTC) unit 2 and a coding method switching judgment unit 3.

More specifically, the signal $D_{IN}$ is fed to a predictor 5 and a difference calculator 8. The predictor 5 provides a predicted signal S1. The difference calculator 8 performs either intra- or inter-frame coding to obtain a difference signal S2 between the predicted signal S1 and the block digital input picture signal $D_{IN}$, the difference signal S2 being fed to the discrete cosine transform (DCT) coding unit 1 and the intra-block predictive coding (NTC) unit 2.

While this embodiment concerns a case of performing either intra- or inter-frame coding, it is possible to permit intra- or inter-field coding as well. In general, it may be applied either intra- or inter-picture (i.e., intra- or inter-frame, or intra- or inter-field) coding.

In the discrete cosine transform (DCT) coding unit 1, a discrete cosine transform (DCT) circuit 11 performs discrete cosine transform of the difference signal S2 to obtain a discrete cosine transform signal S3. A first quantizer 12 then quantizes the signal S3 to obtain a quantized signal S4, which is passed through a delay circuit 13 to a discrete cosine transform (DCT) input terminal "a" of a first selector 4A.

The first selector 4A outputs a selection output S5, which is converted in a variable length coding (VLC) unit 6 together with transmission management data S7 into a variable length coded signal S6, which is tentatively stored in a buffer 7. The buffer 7 sends out transmission data $D_{\overline{OUT}}$ at a rate matched to the transmission rate of a transmission system 9 such as a transmission line and recorder.

The quantized signal S4 from the first quantizer 12 is inversely converted through a first inverse quantizer 14 and an inverse discrete cosine transform (DCT) circuit 15 to provide a difference signal S8 which is fed back through the discrete cosine transform coding input terminal a of a second selector 4B to the predictor 5. Thus, when selector 4B engages its input terminal "a", the predictor 5 reproduces an immediately preceding predictive picture frame represented by the variable length coded signal S6 fed to the buffer 7, the reproduced predictive picture being fed as the predicted signal S1 to the difference calculator 8.

When generating the predicted signal S1, the predictor 5 generates management data representing motion vector, prediction mode, calculation method (of intra- or inter-frame coding) in the difference calculator 8, these data being fed as the transmission management signal S7 to the variable length coding unit 6 for coding together with the data of the selection output S5 into the variable length coded signal S6.

The discrete cosine transform (DCT) coding unit 1 can be of the type, which is shown in, for instance, Adaptive Intraframe/Interframe Coding for HDTV Signals by Using Extrapolative and Interpolative Prediction", the Transactions of Institute of Electronics and Communication Engineers Japan Section, 1987/1, Vol. J70-B, No. 1, p-p. 96–104, or of the type which is shown in Japanese Patent Application No. 410247/1990.

In the intra-block predictive coding (NTC) unit 2, the difference signal S2 from the difference calculator 8 is fed to an intra-block predictor 21. The intra-block predictor 21 derives a typical value of a block with respect to this difference signal S2 and obtains a difference signal of the typical value from each pixel value. The difference signal is fed as a predictive coding signal S10 to a second quantizer 22 for conversion into a quantized signal S11 to be fed to a scan converter 23.

The scan converter 23 rearranges the pixel data of the quantized signal S11 to permit further data compression, the rearranged quantized signal S12 being fed through a differentiation input terminal "c" of a switch 27A to a differentiator 24. The differentiator 24 outputs a differentiation output S13 which is fed through an input terminal "c" of a switch 27B to an intra-block predictive coding input terminal "b" of the first selector 4A.

The switches 27A and 27B have interconnected by-pass terminals "d" and are adapted to bypass, if necessary, the differentiator 24 so as to feed the rearranged quantized signal S12 through their bypass terminals "d" to the intra-block predictive coding (NTC) input terminal "b" of the first selector 4A.

Thus, in such case, compressed picture data obtained through intra-block predictive coding of the difference signal S2 is fed through the variable length coding unit 6 to the buffer 7.

The delay circuit 13 is used to match the process time in the discrete cosine transform (DCT) coding unit 1 to that in the intra-block predictive coding (NTC) unit 2.

The quantized signal S11 from the second quantizer 22 is inversely converted through a second inverse quantizer 25 and inverse intra-block predictor 26 into a predictive difference signal S14 to be fed back through a predictive coding input terminal "b" of the second selector 4B to the predictor 5. The predictor 5 reproduces the immediately preceding picture frame represented by the variable length coded signal S6 fed to the buffer 7, thus obtaining the predicted signal S1.

The difference signal S2 of the difference calculator 8 and the discrete cosine transform signal S3 of the discrete cosine transform circuit 11 are further fed to the coding method switching judgment unit 3. The unit 3 thus effects judgment as to whether the discrete cosine transform of the intra-block pattern is disadvantageous for the data compression factor, thus generating a coding method switching signal S20. If the discrete cosine transform method selected at present is advantageous, the first and second selectors 4A and 4B are switched to the side of the discrete cosine transform coding input terminal a to cause the discrete cosine transform coding unit 1 to execute the coding of the difference signal S2.

If the discrete cosine transform method selected at present is disadvantageous for the data compression factor, on the other hand, the coding method switching judgment unit 3 switches the first and second selectors A and 4B to the side of the intra-block predictive coding input terminal "b" in response to the coding method switching signal S20, thus causing the intra-block predictive coding unit 2 to execute the coding of the difference signal S2.

When generating the coding method switching signal S20, the coding method switching judgment unit 3 generates a coding method switching signal representing the selected coding system, the switching signal thus generated being fed as the transmission management signal S7 to the variable length coding unit 6.

Figure 2:
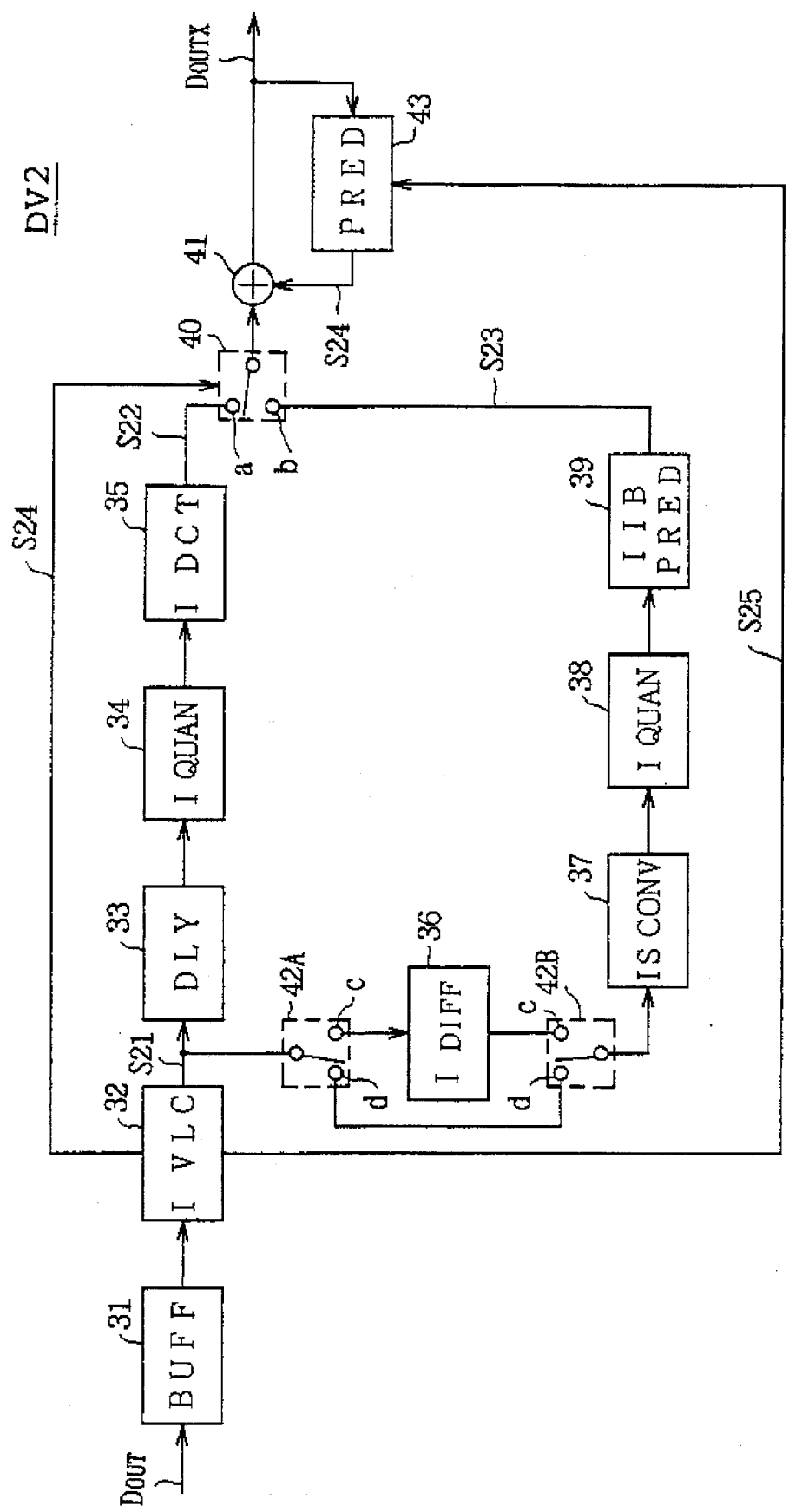
FIG. 2 is a block diagram showing one embodiment of a decoder of the invention.

The transmission data $D_{OUT}$ fed from the encoding system DV1 to the transmission system 9 in the above way, is stored in a buffer circuit 31 of a decoding system DV2 shown in FIG. 2 for inverse coding in an inverse variable length coding unit 32.

In this way, the decoded quantized signal S21 of the transmission data $D_{OUT}$ is fed through a delay circuit 33 for inverse quantizing in the inverse quantizer 34 and then fed to an inverse discrete cosine transform circuit 35 to reproduce the difference signal S22, which is fed through an inverse discrete cosine transform input terminal "a" of a switch 40 to a summation reproduction circuit 41.

The decoded quantized signal S21 is also fed through a differentiator input terminal "c" of switch circuits 42A and 42B to an inverse differentiator 36 for inverse differentiation and then fed to an inverse scan, that is, without inverse differentiation, converter 37, or it is fed as such through bypass input terminals "d" of switch circuits 42A and 42B to the inverse scan converter 37. The decoded quantized signal S21 is thus restored in the inverse scan converter 37 to the original scan order and then inversely converted through an inverse quantizer 38 and an inverse intra-block predictor 39, thus obtaining a reproduced difference signal S23 which is fed through an intra-block predictive coding input terminal "b" of a switch 40 to the summation reproduction circuit 41.

To the switch 40 is fed a coding method switching signal S24 in the management signal separated in the inverse variable length coding unit 32. Thus, the switch 40 is switched to the side of the input terminal "a" or "b" according to the coding method of the transmitted decoded quantized signal S21.

The summing reproduction circuit 41 sums a difference signal S22 or S23 obtained from switch 40 and a predicting signal S24 obtained from predictor 43, and the summing output is derived as a restored data $D_{OUTX}$.

The predictor 43 receives a motion vector, predicting mode signal S25 in the management signal separated in the inverse variable length coding unit 32 from the decoded quantized signal S21 and restores the immediately preceding picture frame data sent during preceding transmission cycle based on the restored data $D_{OUTX}$ and feeds this data as the predicting signal S24 to the summation reproduction circuit 41. In this way, the restored data DOUTX representing the picture frame data being transmitting at present is obtained based on the difference signal S22 or S23 being transmitting at present.

The encoding unit DV1 (FIG. 1) and the decoding unit DV2 (FIG. 2) comprise the following detailed constructions.

(2) Discrete Cosine Transform Coding Unit 1

The discrete cosine transform circuit 11 in the discrete cosine transform coding unit 1 in the encoding system DV1 (FIG. 1), executes a compression processing when changes in the inputted difference signal S2 (and hence brightness changes) are smooth, by making use of a well-known feature of the two-dimensional picture of the discrete cosine transform method that there is a trend of concentration of large values as values of the discrete cosine transform signal S3 (i.e., DCT coefficient values) in the neighborhood of DC coefficient.

FIG. 3 shows an example of schematic representation of pixel data quantity of one block (8 by 8 pixels) of picture in terms of numerical figures of 0 to 100. K1 is a block of the original picture. As shown, the brightness level is changed smoothly from the left top corner toward the right bottom corner. Each pixel has a brightness level of 30 to 100.

When this original picture K1 is subjected to a discrete cosine transform (DCT) process in the discrete cosine transform circuit 11, substantially all the intra-block coefficients are reduced to 0 in the discrete cosine transform signal S3. The result is shown as a transformed picture K2. DCT coefficients having values other than 0 are present on the diagonal from the left top corner to the right bottom corner.

When the DCT coefficients of the transformed picture K2 are subsequently quantized in the first quantizer 12 with a quantizing width Q of Q=10, for instance, which is provided from the buffer 7 with respect to the residual data quantity therein, almost all the quantized DCT coefficients in the quantized signal S4 are reduced to 0, and only large quantized DCT coefficients remain. This result is shown as a quantized picture K3. Thus, by calling out the quantized DCT coefficients of the quantized picture K3 successively according to a coefficient call-out sequence K4 (numerical figures representing orders of call-out), a quantized DCT coefficient series "45-0-0-4-13-4-0-0- . . ." is obtained. By feeding this series through the delay circuit 13 and first selector 4A to the variable length coding (VLC) unit 6, a higher performance coding process can be obtained using a variable length coding method based on Huffman coding or the like (two-dimensional coding in this embodiment).

Figure 4:
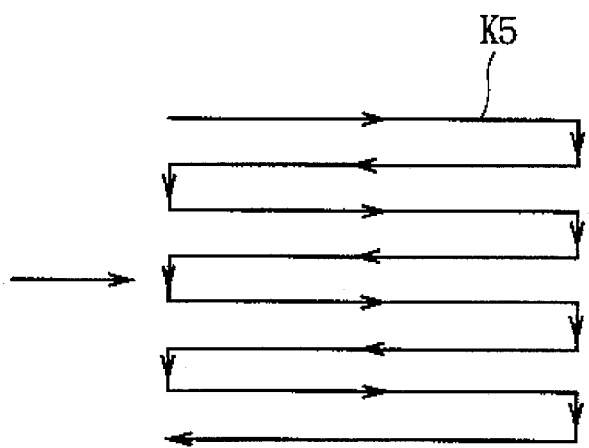
FIG. 4 is a schematic view showing the procedure of call-out of coefficients.

The coefficient call-out series K4 in the case of FIG. 3, the coefficient call-out orders are arranged in an obliquely zigzag fashion from the left top start point toward the right bottom from the consideration of the existence of a two-dimensional correlation of pixels. FIG. 4 shows a coefficient call-out series K5, which may be used for patterns having a horizontally strong correlation of coefficients. In this case, the coefficients are sequentially called out from the top row (0 to 7) of the block and in a vertically zigzag fashion (8 to 15), (16 to 23), . . . .

(3) Intra-Block Predictive Coding Unit 2

In the intra-block predictive coding unit 2, when one block (8 by 8 pixels) of picture data, which contains an edge of a pattern at the left bottom corner, shown as original picture K11 (FIG. 5(A)), is fed as difference signal S2, the intra-block predictor 21 first obtains the mean value of a flat area as a typical value "BASE" of the block and then obtains the difference between the typical value BASE and each intra-block pixel value.

Figure 5:
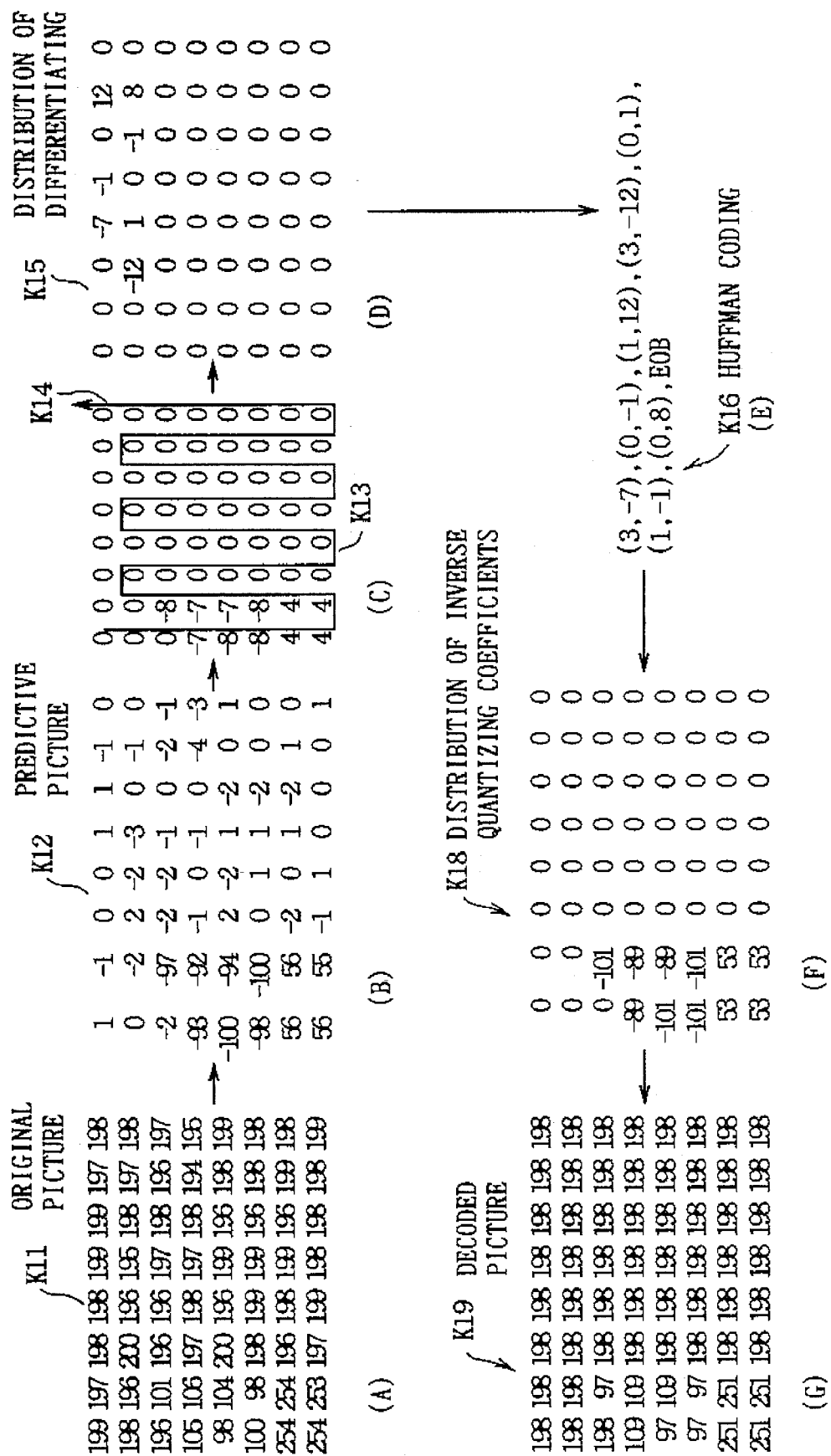
FIG. 5 is a schematic view showing the procedure of intra-block predictive coding.

In the case of the original picture K11 in FIG. 5, the intra-block predictor 21 obtains BASE=198 as the typical value BASE, then obtains predictive picture K12 (FIG. 5(B)) by calculating the difference between the typical value BASE and each pixel value and feeds the data K12 as a predictive coding signal S10 to the quantizer 22.

The quantizer 22 quantizes the difference values of the predictive coding signal S10 with an adaptive quantizing width Q of, for instance, Q=12 to obtain a quantizing coefficient distribution K13 (in FIG. 5(C)). In this embodiment, in the calculation of quantizing, decimal fractions are discarded (which is equivalent to a quantizer having a dead line zone with a value of 6).

For the adaptive quantizing in the intra-block predictive coding (NTC) unit 2, one or more of the following four methods are selectively used for each block.

A first method of adaptive quantizing uses the mean value of picture signal in the block.

Figure 6:
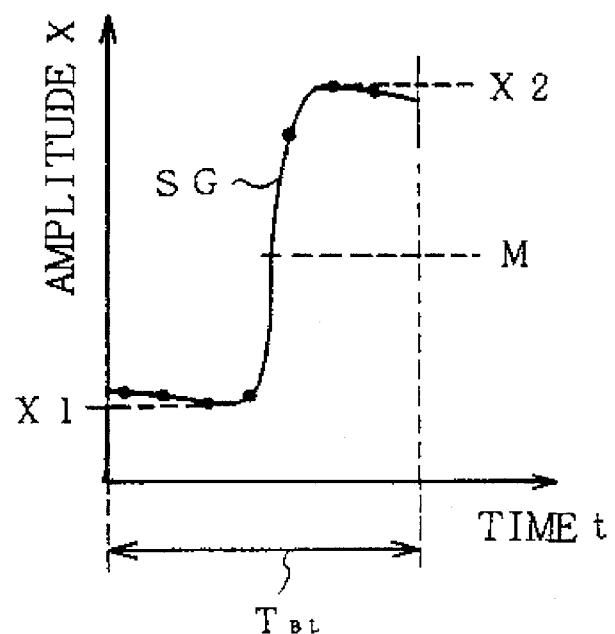
FIG. 6 is a graph showing a characteristic curve when using mean values.
Figure 7:
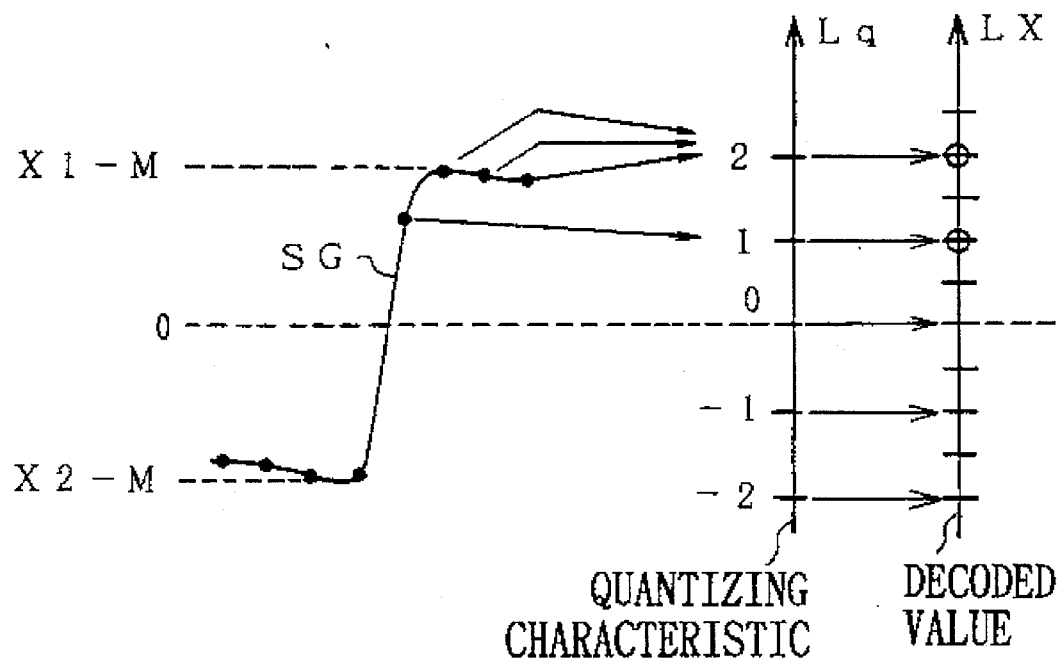
FIG. 7 is a graph showing a characteristic curve of quantizing and decoding when using means values.
Figure 8:
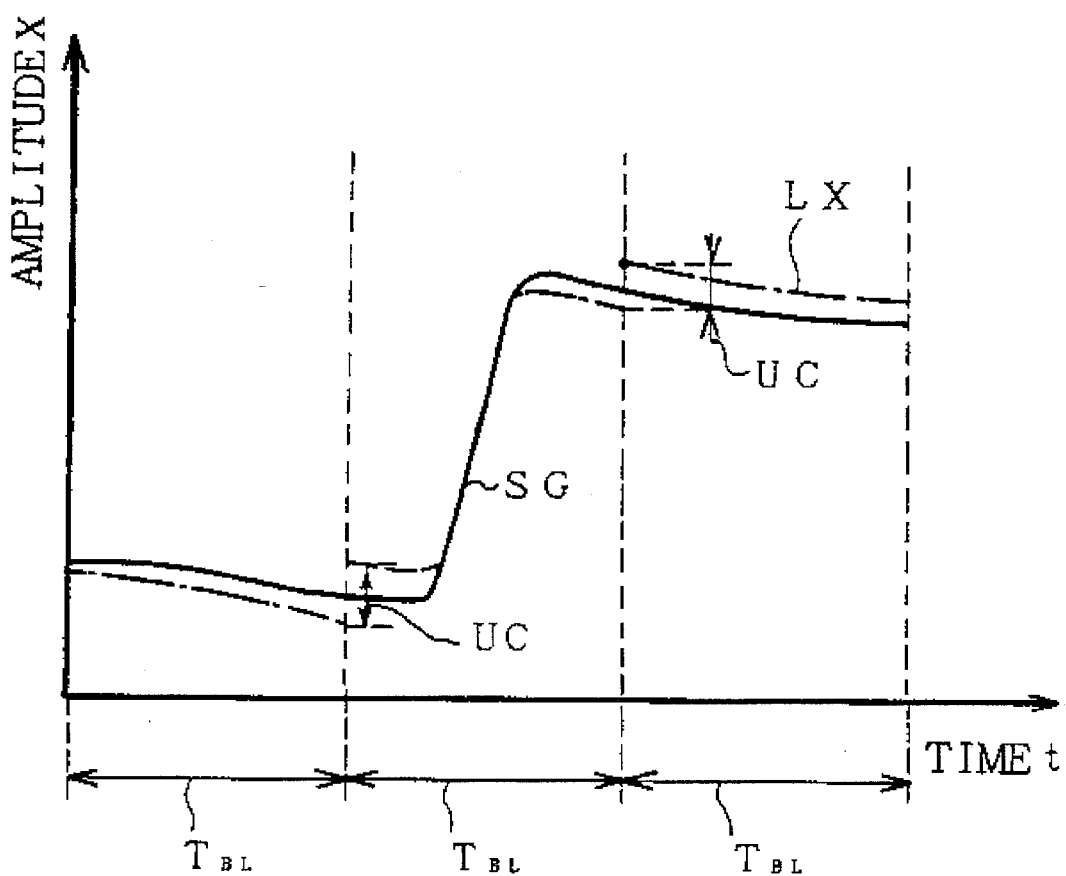
FIG. 8 is a graph showing a characteristic curve in an example of block distortion when using mean values.

More specifically, as shown in FIG. 6, the mean value M of the amplitudes (X1 to X2) of all the intra-block pixels of one-dimensional digital original signal SG is obtained for one block length $T_{BL}$ with respect to time t, and then the difference between the mean value M and signal level (i.e., amplitude X) of each pixel is quantized, as shown in FIG. 7. The quantizing width Q is a value output from the buffer 7 according to the residual data quantity therein. The quantizing code $L_q$ is given as following:

$$L_q=(L-M)//Q \tag{1}$$

(where // represents the rounding of the first decimal place).

The restored value LX is given as following:

$$LX=L_q \cdot Q+M \tag{2}$$

This first adaptive quantizing method has a disadvantage that with increase of the quantizing width Q the restored value distortion is increased. As a result, discontinuity UC is generated in changes in the restored value LX with respect to the original signal SG for each block, thus generating block distortion.

A second method of adaptive quantizing uses adaptive dynamic range coding (ADRC).

This method is shown in "A new ADRC Quantizer", Kondo et al, the Fourth Picture Coding Symposium (PCSJ), Material (4-3).

This adaptive dynamic range coding (ADRC) has a feature that a minimum value of the block is used as a typical value. This is done so because the minimum value is in many cases found in an edge part of the block.

With the usual block, which is as small an area as about 8 by 8 pixels, the possibility of occurrence of a concave brightness level distribution is very low. Therefore, in many cases the minimum value of a block is close to the minimum value of one of the neighboring blocks.

Figure 9:
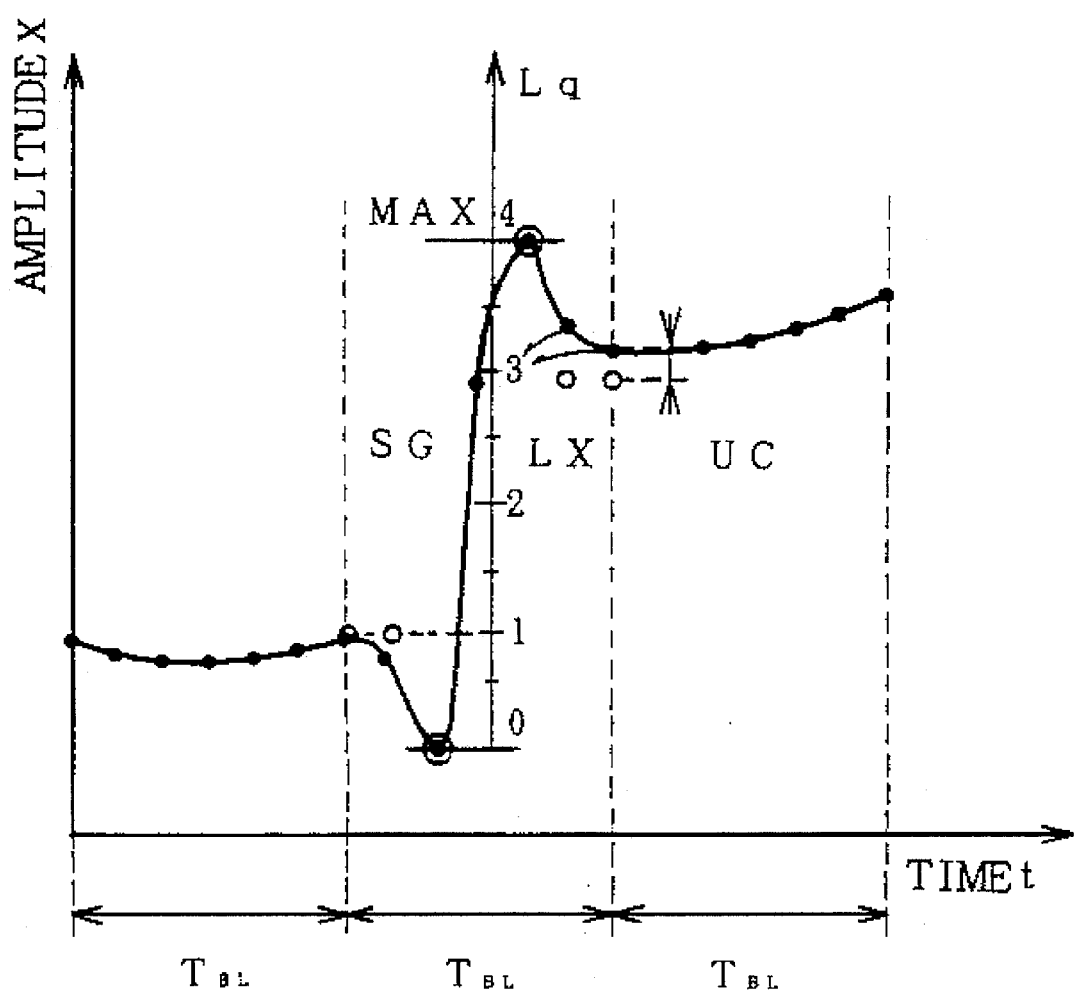
FIG. 9 is a graph showing a characteristic curve when using ADRC.

If a minimum value is found at an edge of the block, the continuity with respect to at least one neighboring block (on the block length start side in this case is as shown in FIG. 9). Thus, even if discontinuity UC is produced with respect to a neighboring block due to deviation between the original signal SG and restored value LX, the block distortion as a whole can be minimized.

Figure 10:
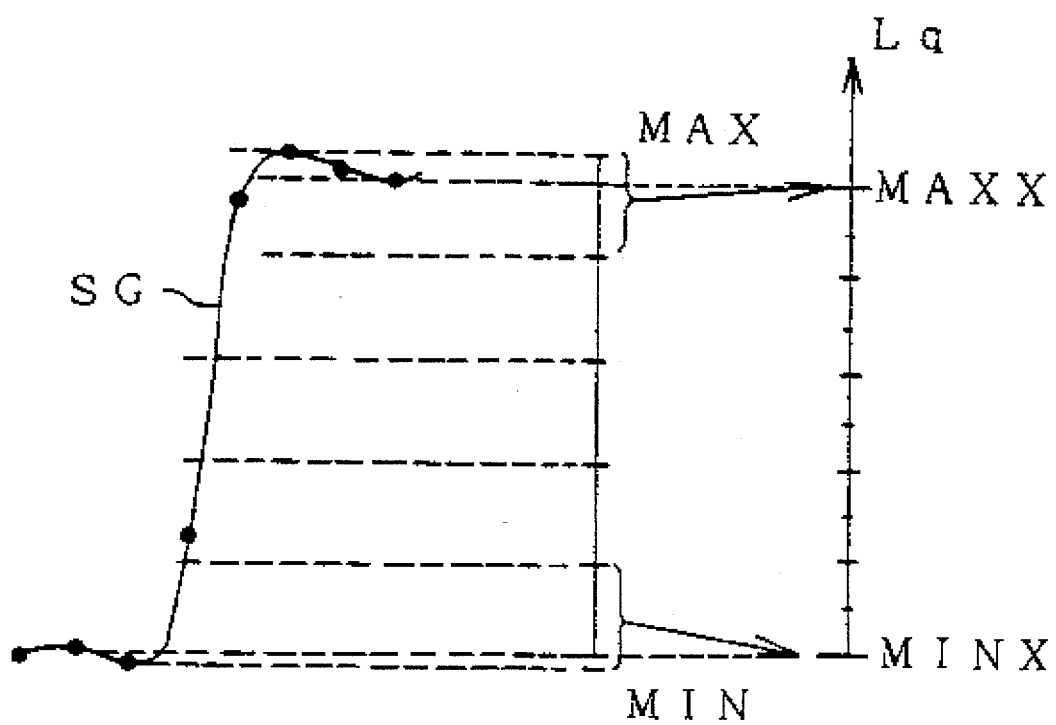
FIG. 10 is a graph showing a characteristic curve in an example of block distortion when using ADRC.

Further, the adaptive dynamic range coding method permits the quantizing code $L_q$ to be obtained after defining new maximum value MAXX and minimum value MINX by using the mean value of signal values contained in the highest and lowest gradation levels, as shown as a one-dimensional coding characteristic in FIG. 10, thus alleviating the influence of noise and isolated points (as shown in Japanese Patent Application Public Disclosure 134910/1990).

A third method of adaptive quantizing uses edge matching quantizing.

This method will be described in conjunction with first a case, in which the digital original signal SG is one-dimensional.

Figure 11:
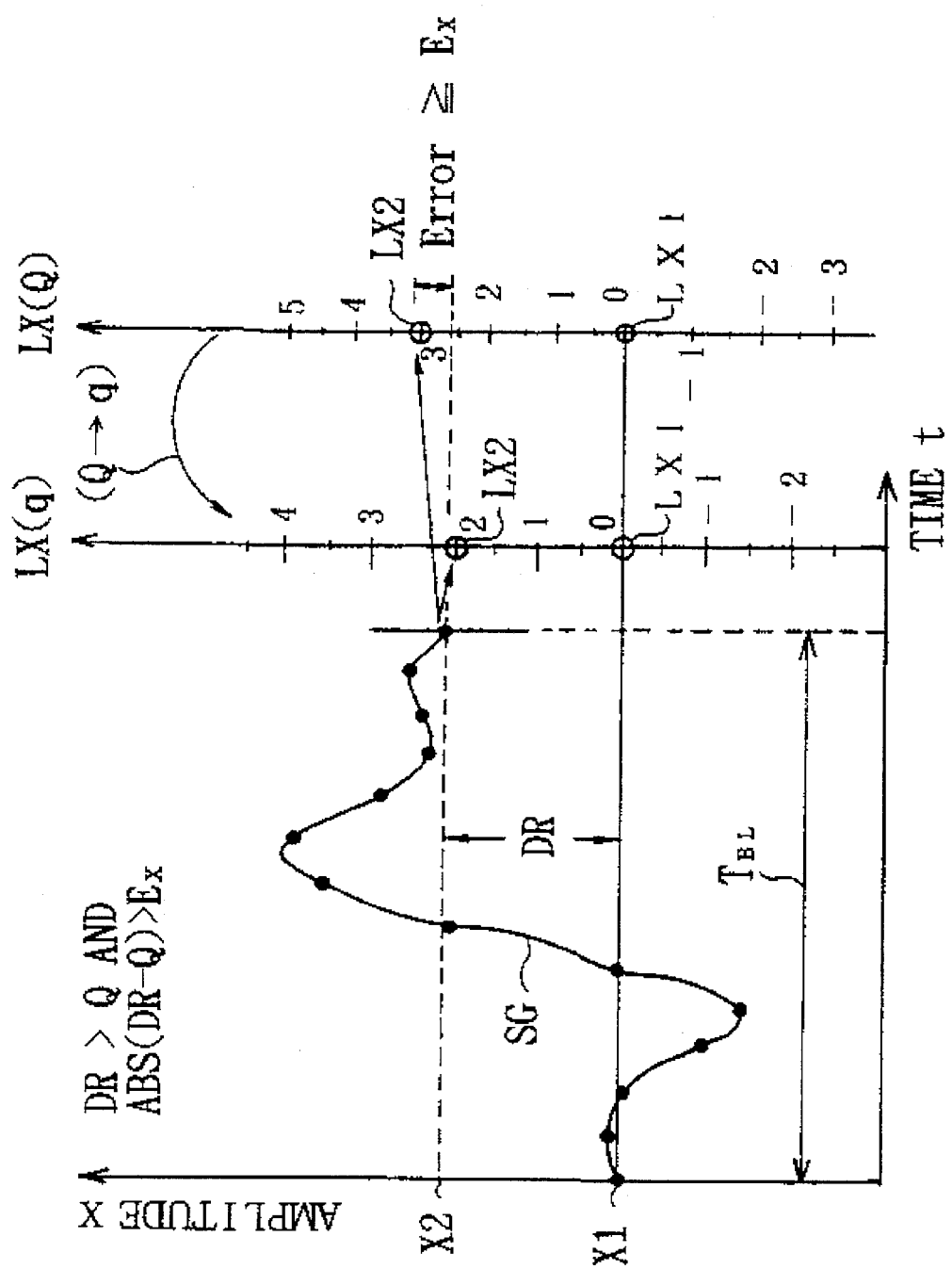
FIG. 11 is a graph showing a characteristic curve in first edge matching quantizing method.
Figure 12:
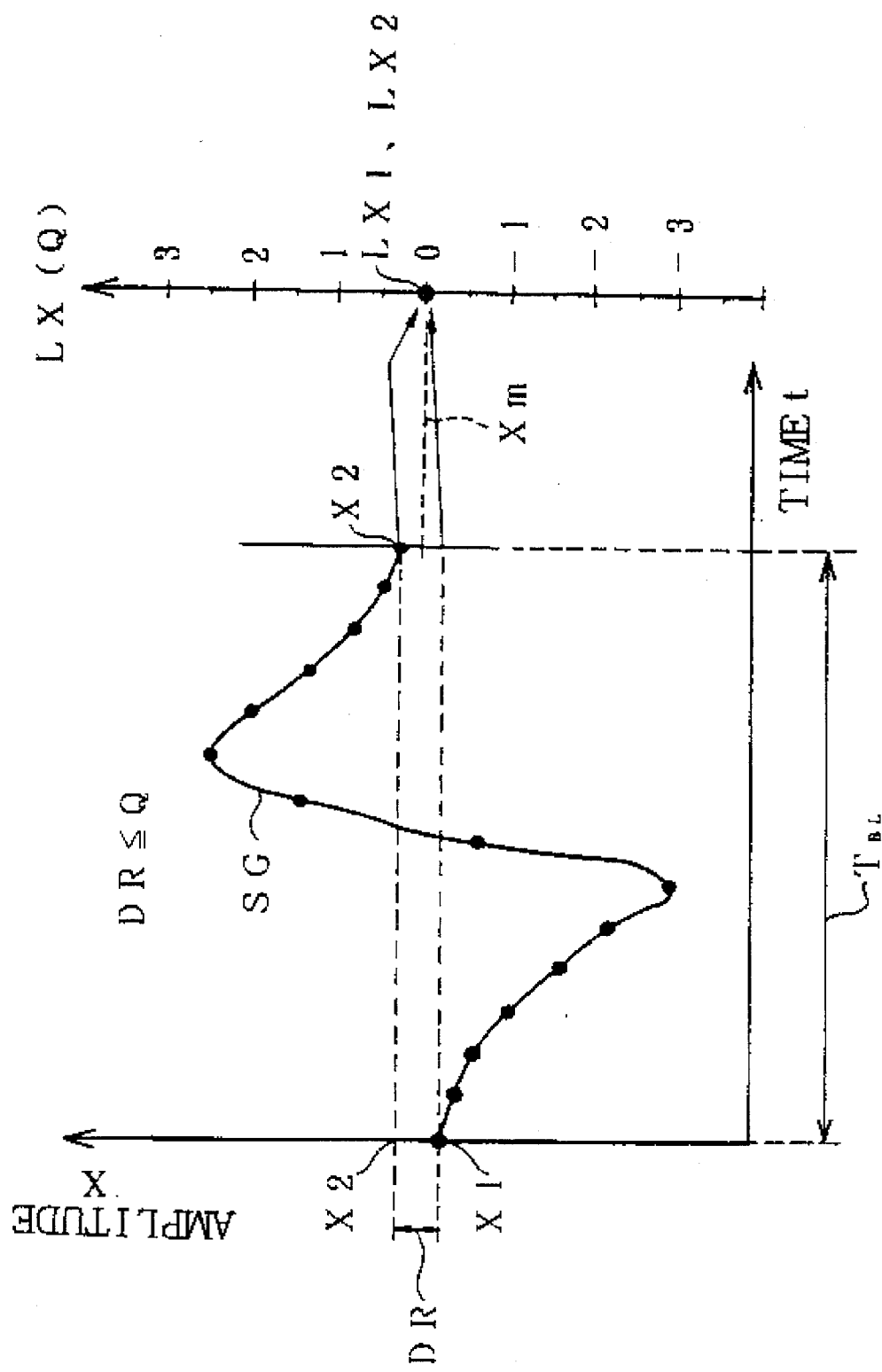
FIG. 12 is a graph showing a characteristic curve in the first edge matching quantizing method.

In the third adaptive quantizing method, the quantizing width output from the buffer 7 is altered such that with respect to the one-dimensional original signal SG of a block length $T_{BL}$ as shown in FIGS. 11 and 12 the output restored values LX1 and LX2 of the opposite end signal values X1 and X2 ($X1 \leq X2$ for the sake of the simplicity) of the block are less than a predetermined error Ex. The algorithm involved is as follows.

Denoting the intra-block pixel signal level by L and the permissible restored value error of the block end signal values X1 and X2 by Ex, the difference D between the block end signal values X1 and X2 is $$D = X2 - X1 \quad (3)$$

As for the quantizing width Q and signal value X1, if $$D > Q \quad (4)$$

and also if $$ABS(D-Q) > Ex \quad (5)$$

the quantizing width Q instructed by the buffer 7 is changed to a quantizing width q instructed to the quantizer 22 from the intra-block predictor 21, while the signal value X1 is held without any change.

However, for the quantizing width q values greater than the quantizing width q and satisfying $$Ex \geq ABS(D - (D//q)*q) \quad (6)$$

are obtained with respect to all the sets of quantizing width Q and difference D and written as table in a read-only memory (ROM).

If $$D > Q \quad (7)$$

and also if $$Ex \geq ABS(D-Q) \quad (8)$$

both the quantizing width Q and signal value X1 are held without any change.

If $$D \leq Q \quad (9)$$

the quantizing width Q is held without any change, while providing $$Xm = (X1+X2)//2 \quad (10)$$

and $$X1 = Xm \quad (11)$$

Consequently, we obtain, as the quantizing code $L_q$, $$L_q = (L - X1)//Q \quad (12)$$

and, as the restored value LX, $$LX = L_q*Q + X1 \quad (13)$$

In this system, the error of the restored signal at the opposite ends of the block can be held within Ex, and thus it is possible to readily maintain enhanced inter-block continuity.

While the above description has concerned with the case of applying the third adaptive quantizing method to the one-dimensional digital original signal SG, in case of expanding this one-dimensional method to two-dimensional blocks, typical values BASE1 and BASE2 are used for the respective signal values X1 and X2, and the block signal is quantized and inversely quantized like the one-dimensional case.

While the above description has concerned with a quantizer without any dead zone (or insensitive zone), it is possible to use a quantizer with a dead zone as well.

A fourth method of adaptive quantizing uses second edge matching quantization.

The method will first be described in conjunction with a case, in which the digital original signal SG is one-dimensional.

Figure 13:
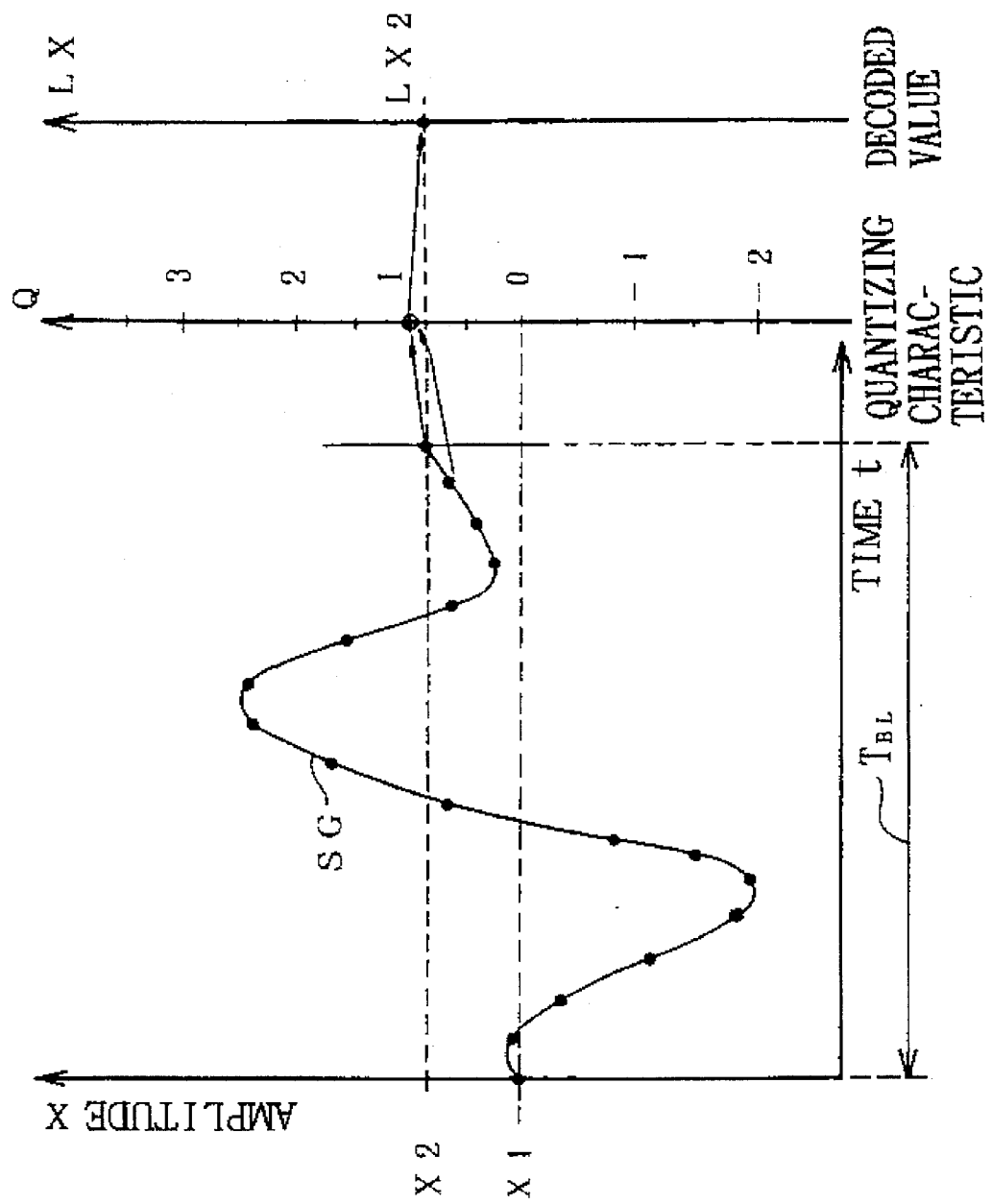
FIG. 13 is a graph showing a characteristic curve in second edge matching quantizing method.
Figure 14A:
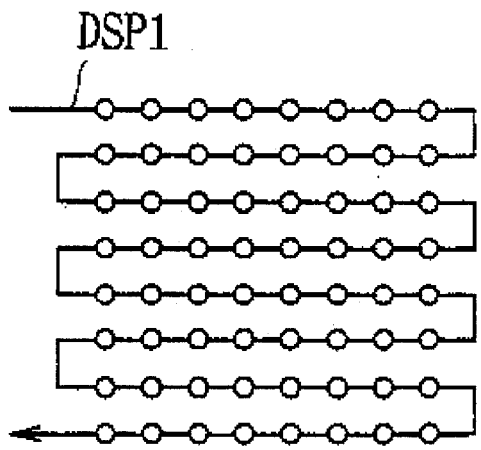
FIG. 14 is a schematic view showing an example of data scan path used for NTC.
Figure 14B:
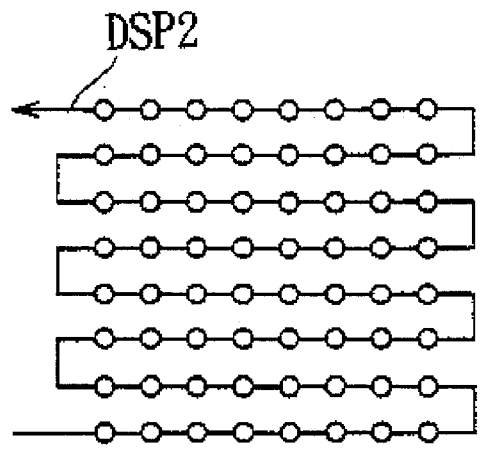
Figure 14C:
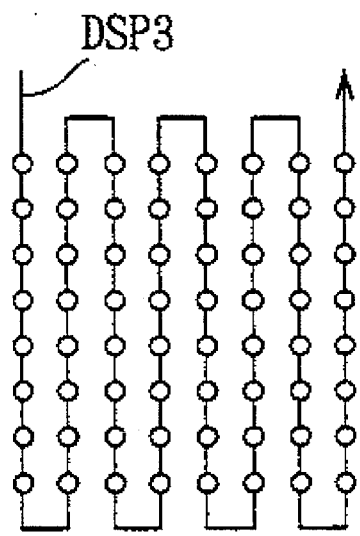
Figure 14D:
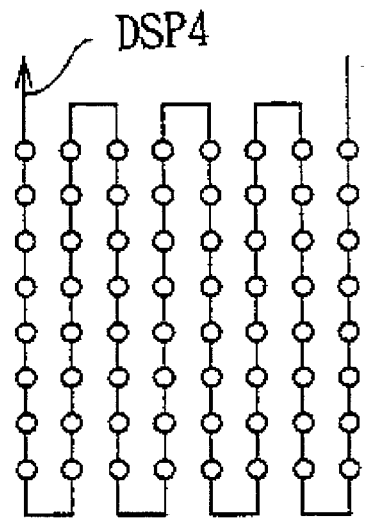

In this method, the decoded values are changed on the decoder side such that the signal values X1 and X2 ($X1 \leq X2$ for the sake of the simplicity) with respect to the one-dimensional original signal SG of a block length $T_{BL}$ as shown in FIG. 13 are output directly as decoded values. Denoting the intra-block pixel signal level by X and the quantizing width data output from the buffer 7 by Q, the quantization code $L_q$ is $$L_q = (L-X1)//Q \quad (14)$$

The encoding system DV1 (FIG. 1) transmits, in addition to the quantizing code $L_q$, the signal value X1, the difference D between the signal values X1 and X2 and the quantization width Q to the decoding system DV2. In the decoding system DV2, the signal values X1 and X2 and quantizing width Q are received as quantizing parameters, and a quantized value 2q of the signal value X2 is first calculated using an equation:

$$X2q = (X2-X1)//Q \quad (15)$$

Then the restored value LX is restored as $$LX = LX2 \quad (16)$$

if the quantizing code $L_q$ is equal to X2g, and otherwise as $$LX = L_q*Q + X1 \quad (17)$$

The second edge matching quantizing method is simple in algorithm compared to the previous first edge matching coding method and permits simplification of the constitution in that no ROM table for changing the quantizing width Q is needed.

When expanding this second edge matching quantizing method to two-dimensional block signal, typical values BASE and BASE' are used as the respective signal values X1 and X2 for quantizing and inverse quantizing of the block signal as in the case of one-dimensional block signal.

While the above description has concerned with a quantizer without dead zone (or insensitive zone), it is possible to use a quantizer with a dead zone as well.

The functions of the quantizer and inverse quantizer described in connection with the above first to fourth adaptive quantizing methods are the same as those broadly used in the discrete cosine transform (DCT) coding except for the execution of the subtraction or addition of a typical value of block. Thus, it is possible to permit the quantizer and inverse quantizer to be used commonly in the intra-block predictive coding (NTC) unit 2 and discrete cosine transform (DCT) coding unit 1 by making the processing of subtraction or addition of the typical value of block independent from the quantizer and inverse quantizer.

Subsequently, the scan converter 23 (FIG. 1) executes adaptive coefficient call-out according to a quantized coefficient distribution K13 (in FIG. 5(C)) represented by the quantized signal S11. In this embodiment, the quantized coefficients in the quantized coefficient fashion as represented by a coefficient call-out sequence K14 (in FIG. 5(C)). In this way, the rearranged quantized signal S12 produced as a result of rearrangement of the individual quantized coefficients is output from the scan converter 23.

The block signal after the quantization, fed to the scan converter 23 of the intra-block predictive coding (NTC) unit 2, is rearranged by scan conversion back to the one-dimensional arrangement. The block signal after the quantizing is transmitted by an end-or-block (EOB) method. In this method, the scan converted signals are scanned in their sequence, and if there is a continuation of coefficients of "0" up to the last coefficient, this continuation of "0"s is transmitted as a sole code "EOB" (which see FIG. 5(E)).

Thus, by selecting a data scan path, which permits transmission of the code "EOB", in as early timing as possible, high compression factor data coding can be obtained.

In this embodiment, four different data scan paths DSP1 to DSP4 shown in FIGS. 14(A) to 14(D) are prepared.

One of these first to fourth data scan paths DSP1 to DSP4 is adaptively selected according to the intra-block edge shape.

FIG. 15 shows the accurate definition of the algorithm in C language. The summation of the absolute values of the block signal after the quantizing in each of four areas "PIXEL_AREA1", "PIXEL_AREA2", "PIXEL_AREA3" and "PIXEL_AREA4" shown in FIG. 15(A) is calculated, and the area having the greatest summation is detected. The data scan path is selected according to the result of detection.

Figure 16:
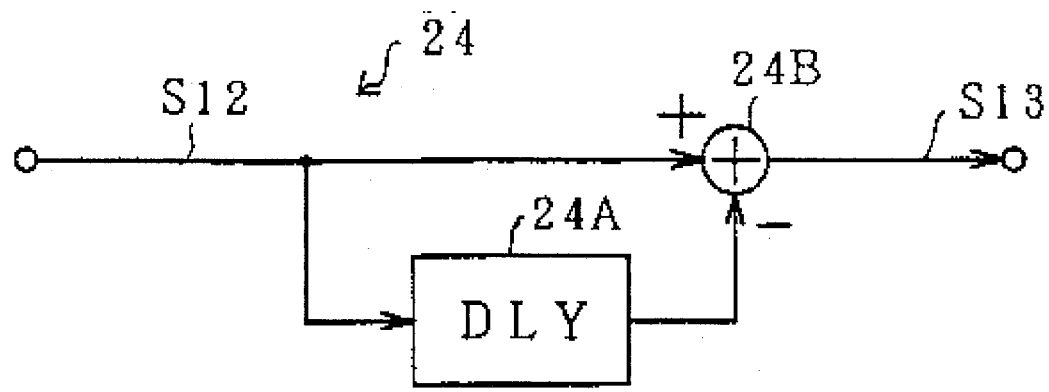
FIG. 16 is a connection diagram showing a differential coding circuit.

Finally, the differentiator 24 differentiates the rearranged data, having been fed to it through the switch 27A (FIG. 1), consecutively from the start of the data and between adjacent data to obtain a differentiated distribution K15 (in FIG. 5(D)). In the differentiator 24, as shown in FIG. 16, a delay line 24A delays the rearranged quantized signal S12 by one process period, and a subtracter 24B subtracts the delayed signal from the rearranged quantized signal S12 form a differentiated distribution K15, the subtraction output being transmitted as a differentiated output S13.

There are cases when there still remain much self correlation of signal in the coefficients after the scan conversion. Thus, further data compression is possible by subsequently executing a differentiating process. The differentiator 24 takes the difference of pixel value with respect to the value of the immediately preceding pixel for signal Yi obtained after the scan conversion in the scan converter 23, thus obtaining a predictive error signal Ei given as $$Ei=Yi-Y(i-1) \quad (18)$$

This predictive error signal Ei can take a value of −255 to +255 if the input signal is of 8 bits. Thus, if it is to be transmitted without changing its signal form, 9 bits are required, that is, one extra bit is necessary as a code perpixel. However, it is well known that the predictive error signal Ei is mostly concentrated around zero as its center. Thus, instead of expressing all the signals with 9 bits, by assigning small bit length codes to a large number of signal values the block signal of the whole block can be expressed with a mean bit length, which is not only smaller than 9 bits but also far smaller than the original 8-bit input signal.

As a method of on-off switching the differentiator 24, if the number of signals other than zero is found to be reduced as a result of actual differentiating processing, the differentiator 24 is turned on, that is, the switches 27A and 27B are switched to the side of the differentiator 24. Otherwise, the switches 27A and 27B are switched to the bypass side.

The coded differential data which is thus obtained in the intra-block predictive coding unit 2 is coded in the variable length coding (VLC) unit 6 by Huffman variable length coding (in this embodiment by the two-dimensional coding as noted above) to form Huffman code series K16 (in FIG. 5(E)). In this way, high efficiency coding can obtained.

The transmitted data $D_{OUT}$ obtained in the coding system DV1, having been transmitted on the basis of the Huffman code series K16 (in FIG. 5) to the decoding system DV2, is inversely converted through the inverse variable length coding unit 32, inverse differentiator 36, inverse scan converter 37 and inverse quantizer 38 to obtain an inversely quantized coefficient distribution K18 (in FIG. 5(F)) and then restored to a restored picture K19 (in FIG. 5(G)). With addition of typical value BASE1 through the predictor 43 and adder 41.

Figure 17:
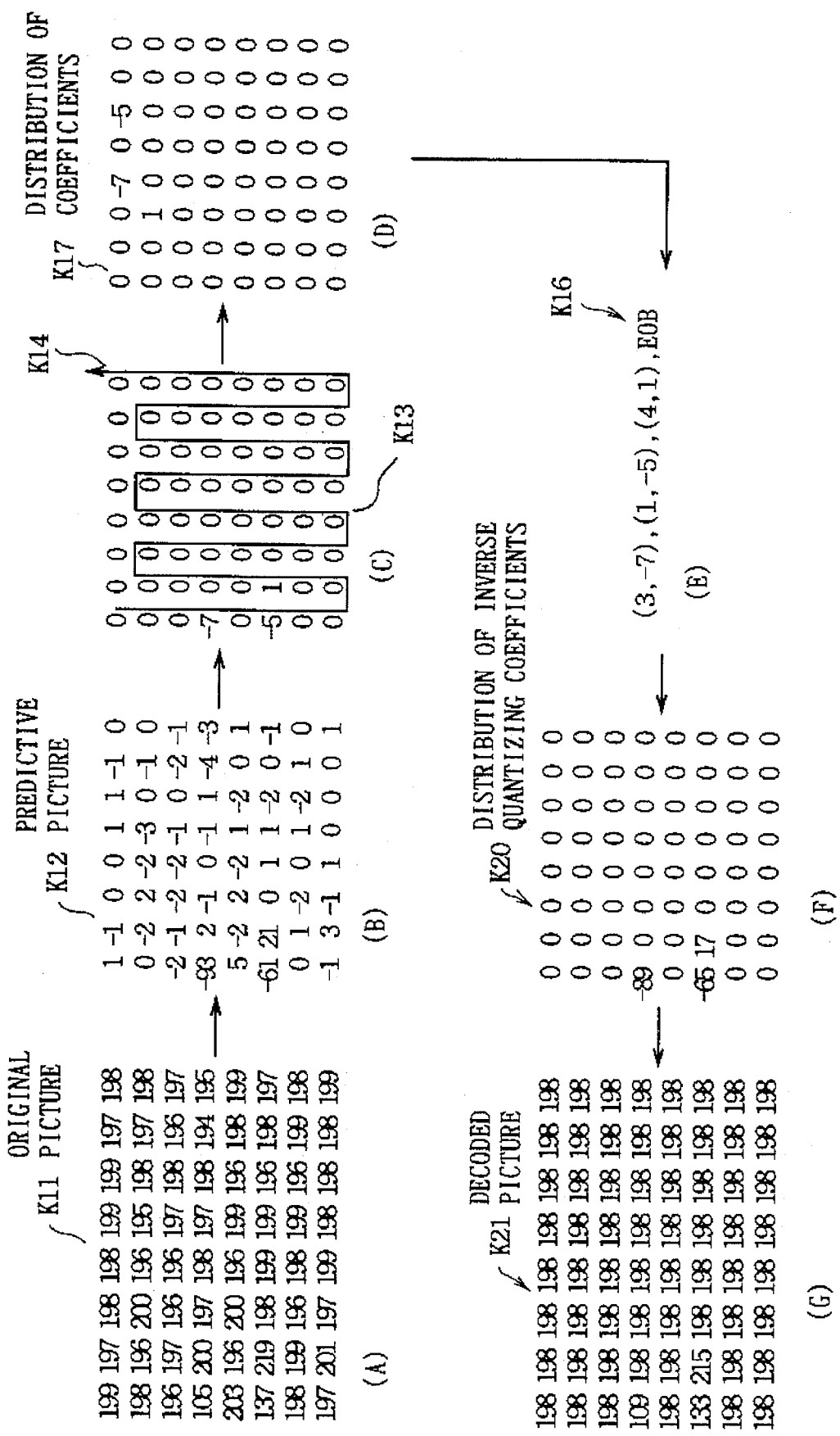
FIG. 17 is a schematic view showing a different procedure of intra-block predictive coding.

In case when the differentiator 24 (FIG. 1) is unnecessary, the switches 27A and 27B are switched to the side of the bypass output terminal "d" to lead the rearranged quantized signal S12 along the bypass. In this case, as shown in FIG. 17 in correspondence to FIG. 5, a predicted picture K12 (in FIG. 17(B)) and a quantized coefficient distribution K13 (in FIG. 17(C)) are obtained consecutively based on the original picture K11 (in FIG. 17(A)), and then by calling out coefficients in a coefficient call-out sequence K14 (in FIG. 17(C)), a coefficient distribution K17 (in FIG. 17(D)), which is obtained by merely rearranging the quantized coefficient values of the quantized coefficient distribution K13, is fed to the variable length coder 6, thus obtaining a Huffman code series K16 (in FIG. 17(E)).

Again in this case, an inversely quantized coefficient distribution K20 (in FIG. 17(F)) and a restored picture K21 (in FIG. 17(G)) are restored in the decoding system DV2.

(4) Coding Method Switching Judgment Unit 3

The coding method switching judgment unit 3 (FIG. 1) judges that coding of a motion picture signal for each block unit is to be performed by which a discrete cosine transform coding (DCT) or an intra-block predictive coding (NTC).

The coding method switching judgment unit 3 judges any coding method having to be selected, based on a spatial area or a discrete cosine transform (DCT) output area being within the intra-block picture information.

First coding method switching judgment is effected in the picture block space area. With a pattern having sharp brightness changes (specifically a picture including edge portions or detailed portions), the dynamic range DR (DR=maximum value−minimum value) of intra-block picture signal takes a large value. With such a pattern the discrete cosine transform (DCT) is disadvantageous for the data compression factor. That is, the intra-block predictive coding (NTC) has to be selected. In this case, the coding method switching judgment unit 3 derives the intra-block dynamic range DR from each block, and then for a block with a value of DR exceeding an appropriate threshold value THA selected based on the compression factor and pattern deterioration, the unit 3 judges that the intra-block predictive coding (NTC) unit 2 should be used for the coding.

In a second method of coding method switching judgment, the judgment is effected in the discrete cosine transform (DCT) output area. As for the discrete cosine transform coefficients in case when motion picture signal is subjected to two-dimensional discrete cosine transform in blocks (or macro-blocks) each of 8 by 8 pixels, for instance, coefficient F(0,0) in row 0 and column 0, corresponding to the left top corner of the block, corresponds to a DC component representing the intra-block mean brightness of the picture. As one goes to the right from the coefficient F(0,0), the coefficients represent high frequency components of vertical fringes in the block, and as one goes down, the coefficients represent horizontal fringe high frequency components.

FIG. 18 shows an output obtained as a result of the discrete cosine transform of a block having a sharply changing brightness pattern like an edge portion. Output areas of discrete cosine transform coefficients in the 8-by-8 pixel block can be largely classified into the following three different pattern cases. In FIG. 18, the "circle" mark represents a position of a high (or low) brightness pixel, and the "cross" mark represents a position, at which a large intra-block discrete cosine transform coefficient is liable to be generated.

Figure 18A:
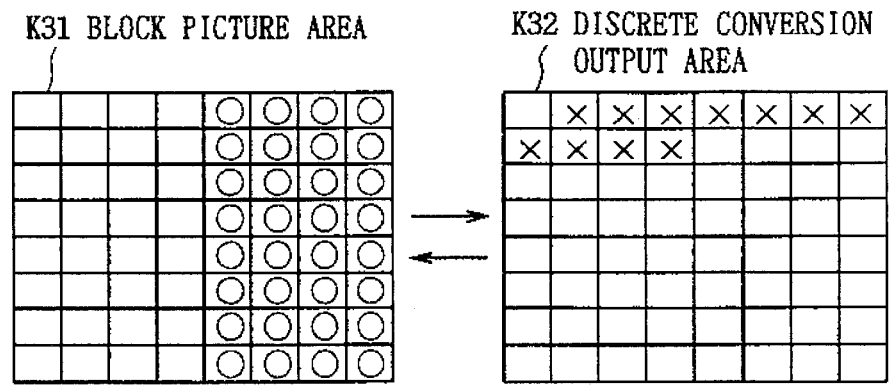
FIG. 18 is a schematic view showing the relation between an edge and DCT coefficient.

A first pattern, as shown in FIG. 18(A), is in a case of a block picture area K31 having a vertical edge. In this case, the discrete cosine transform output area K32 has high energy discrete cosine transform (DCT) coefficients concentrated in an area like a horizontal line extending from the first coefficient position. This case is referred to as "case 1".

Figure 18B:
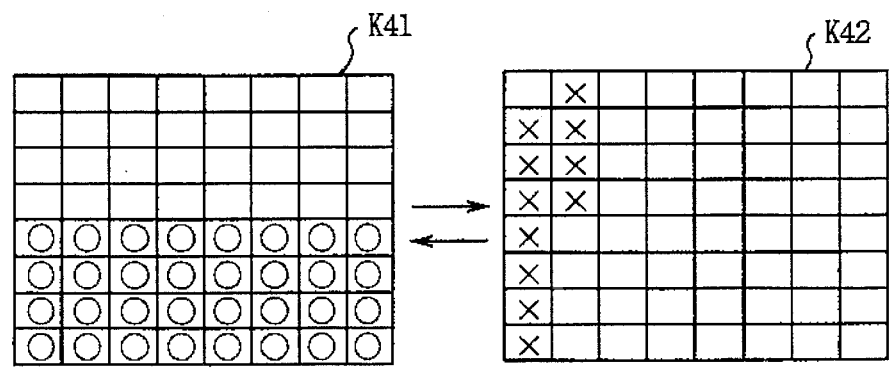

A second pattern, as shown in FIG. 18(B), is in a case of a block picture area K41 having a horizontal edge. In this case, the discrete cosine transform output area K42 has high energy discrete cosine transform coefficients concentrated in an area like a vertical line extending from the first coefficient position. This case is referred to as "case 2".

Figure 18C:
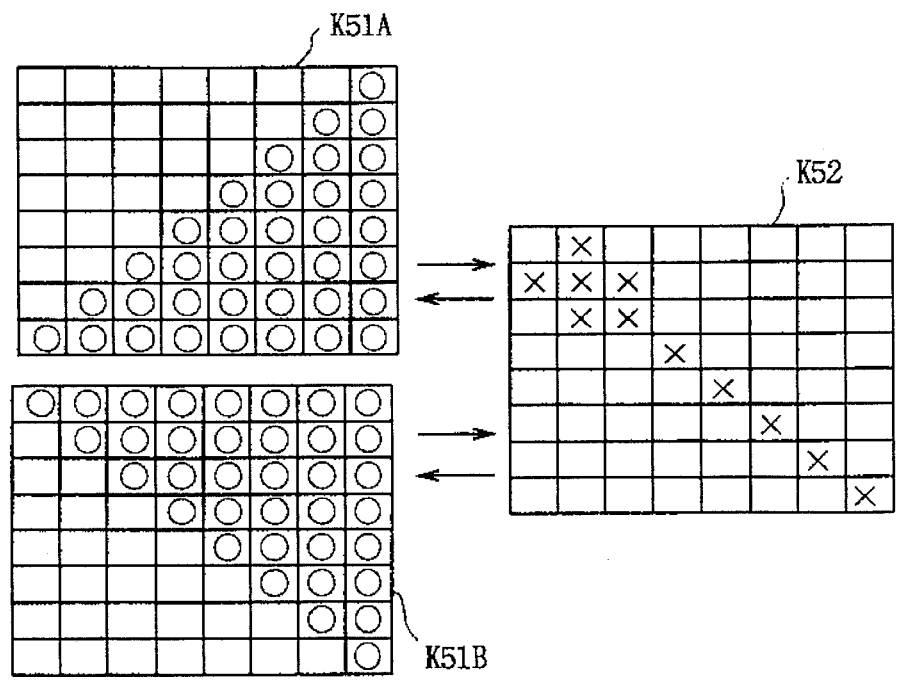

A third pattern, as shown in FIG. 18(C), is in a block picture area K51A or K51B having an obliqued edge. In this case, the discrete cosine transform output area K52 has high energy discrete cosine transform coefficients concentrated in an area like an oblique line extending from the first coefficient position. This case is referred to as "case 3".

The coding method switching judgment unit 3 obtains, for the cases in FIGS. 18(A) to 18(C), the summation Fa of the absolute values of all the discrete cosine transform coefficients except the DC component and also the summations F1 to F3 of the absolute values Of the discrete cosine transform coefficients indicated by the "cross" marks in the discrete cosine transform output areas K32, K42 and K52 of the cases 1 to 3 for each block, and using the largest one Fmax of the absolute value summations F1 to F3, it judges that the intra-block predictive coding unit 2 should be used for coding a block, in which the ratio of the largest absolute value summation Fmax to the absolute value summation Fa exceeds an appropriate threshold value THB selected from the considerations of the compression factor and pattern deterioration.

In a third method of coding method switching judgment, the judgment is effected in both of the discrete cosine transform output area and picture block space area. In this case, the coding method switching judgment unit 3 determines the coding method to be used by executing a coding method selection routine RT1 shown in FIG. 19.

Figure 19:
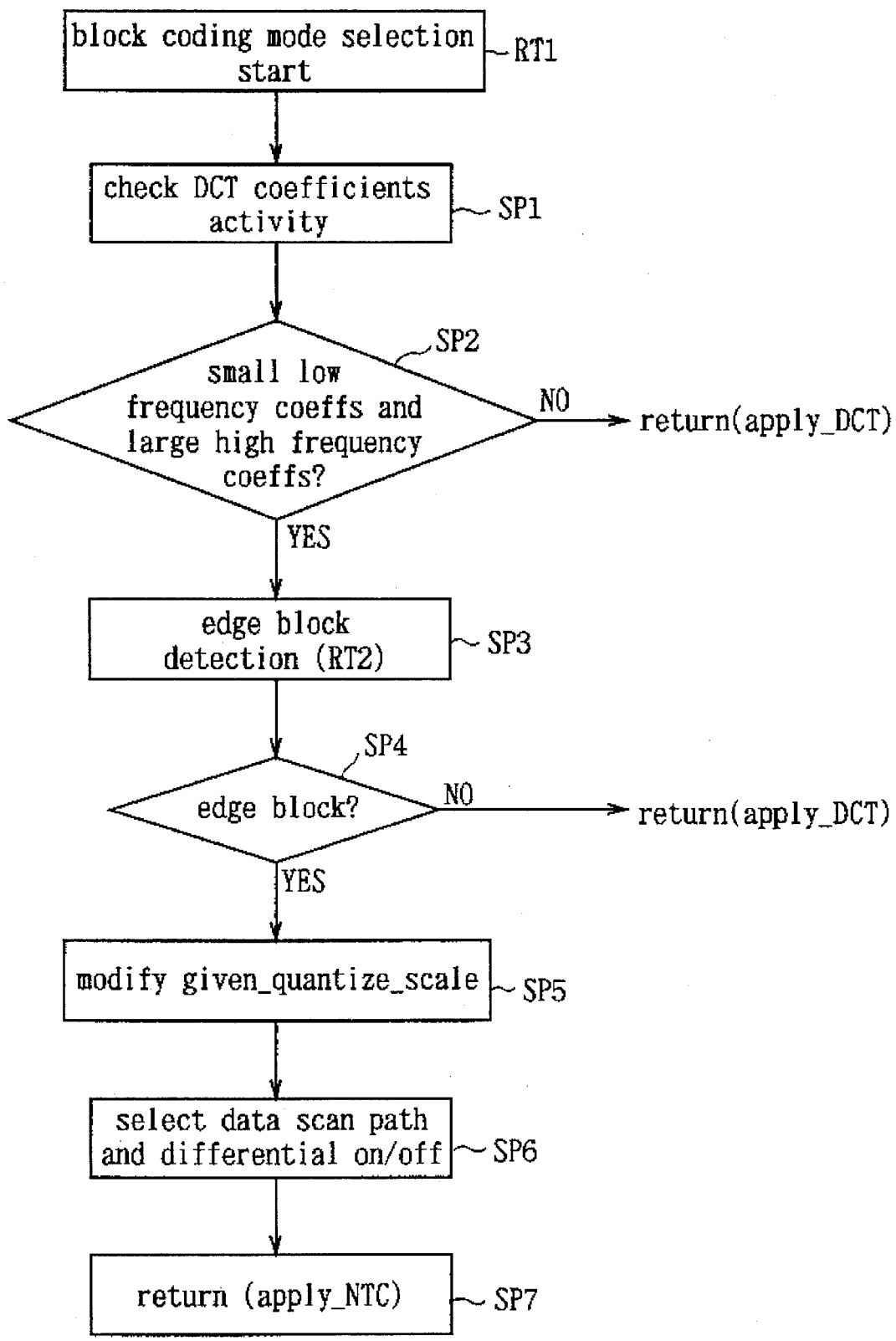
FIG. 19 is a flow chart showing the procedure of coding method selection.

In the coding method selection routine RT1 shown in FIG. 19, in a step SP1 the coding method switching judgment unit 3 checks the output as a result of the discrete cosine transform of the input picture block according to the discrete cosine transform signal S3 of the discrete cosine transform circuit 11, and in a step SP2 it checks whether the discrete cosine transform output area block has transform coefficients representing a sharply changing brightness pattern like an edge (i.e., both of small low and large high frequency coefficients).

This check is done for utilizing, for the coding method switching, a character of the sharply changing brightness pattern that broadly distributed frequency components from low to high frequencies are generated in the discrete cosine transform output area. At this time, the coding method switching judgment unit 3 executes an algorithm shown in FIGS. 21 and 22.

Denoting the summation of the second powers of 17 low frequency area coefficients exclusive of the left top corner DC component, as shown in FIG. 21(A), by "low_ac_power" and the summation of the second powers of all the discrete cosine transform coefficients except the DC component by "all_ac_power", if "low_ac power" is no greater than a threshold "LITTLE_AC THRESHOLD" and also if the ratio between "low_ac_power" and "all_ac_power" is no less than a threshold value "AC_CONCENTRATE_THRESHOLD", it is judged that the discrete cosine transform system should be used for coding this input picture block. At this time, a NO result is yielded in the step SP2 in FIG. 19, and the discrete cosine transform coding unit 1 for the execution of the coding.

Otherwise, the pertinent block is determined to be a candidate block for the intra-block predictive coding (NTC). At this time, the coding system judging unit 3 obtains a YES result in the step SP2 in FIG. 19, and thus it executes the next step SP3.

The threshold values "LITTLE_AC_THRESHOLD" and "AC_CONCENTRATE_THRESHOLD" and the low frequency region may be set adequately from the considerations of the compression factor and pattern deterioration.

Figure 20:
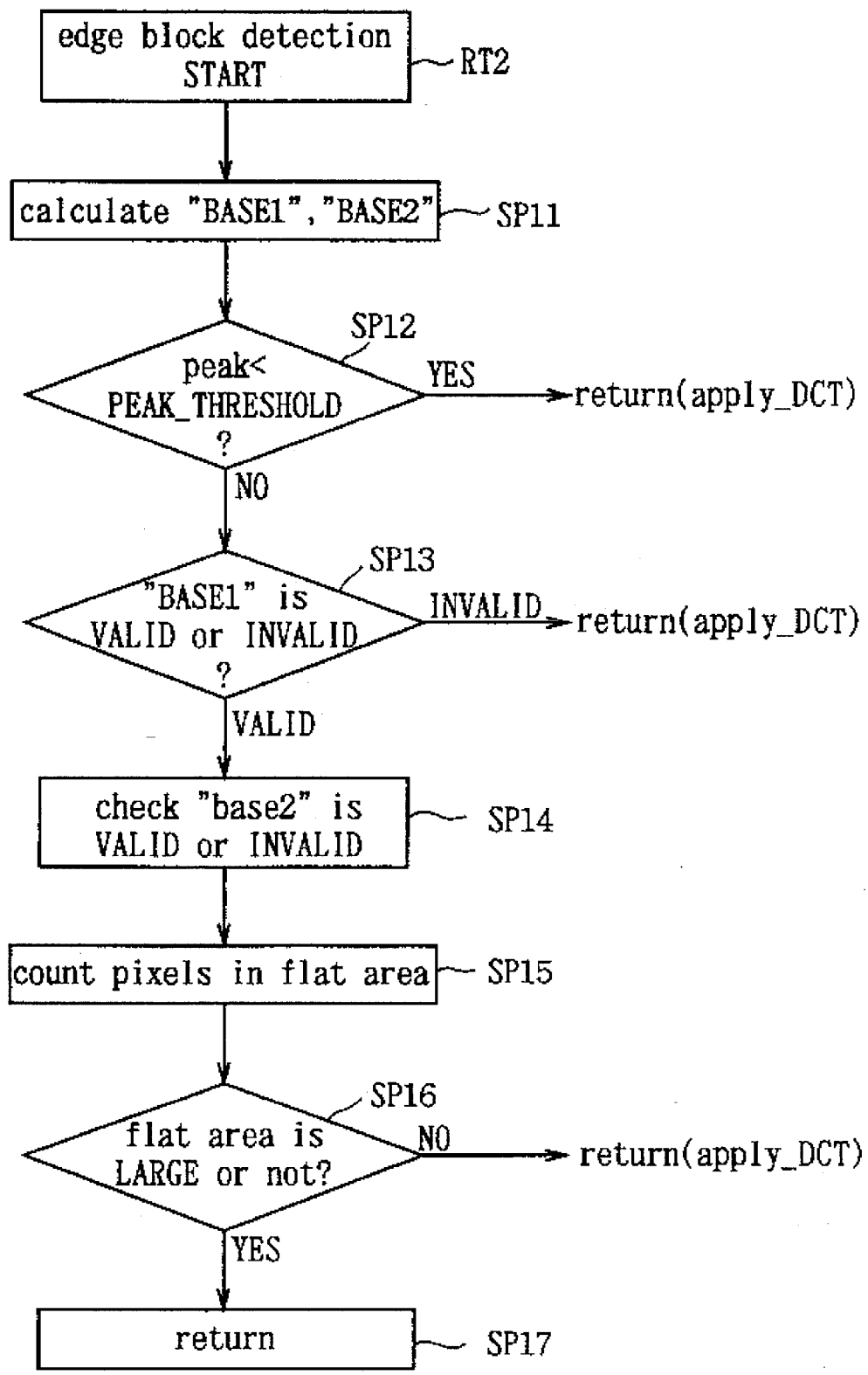
FIG. 20 is a flow chart showing a contour block detection sub-routine.

The coding method switching judgment unit 3 executes in the step SP3 an edge block detection sub-routine RT2 shown in FIG. 20 to detect a block including an edge, and then in the next step SP4 it judges whether the detected block includes edge picture.

In the edge block detection sub-routine RT2 shown in FIG. 20, in a step SP11 the coding method switching judgment unit 3 calculates the typical values "BASE1" and "BASE2" of the block.

The typical values "BASE1" and "BASE2" of the block are mean values of flat area in the pertinent block.

Figure 22D:
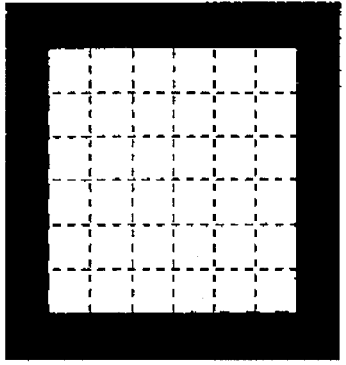
FIG. 22 is a schematic view showing positions of intra-block pixels used for the estimation of a typical value of block.
Figure 23A:
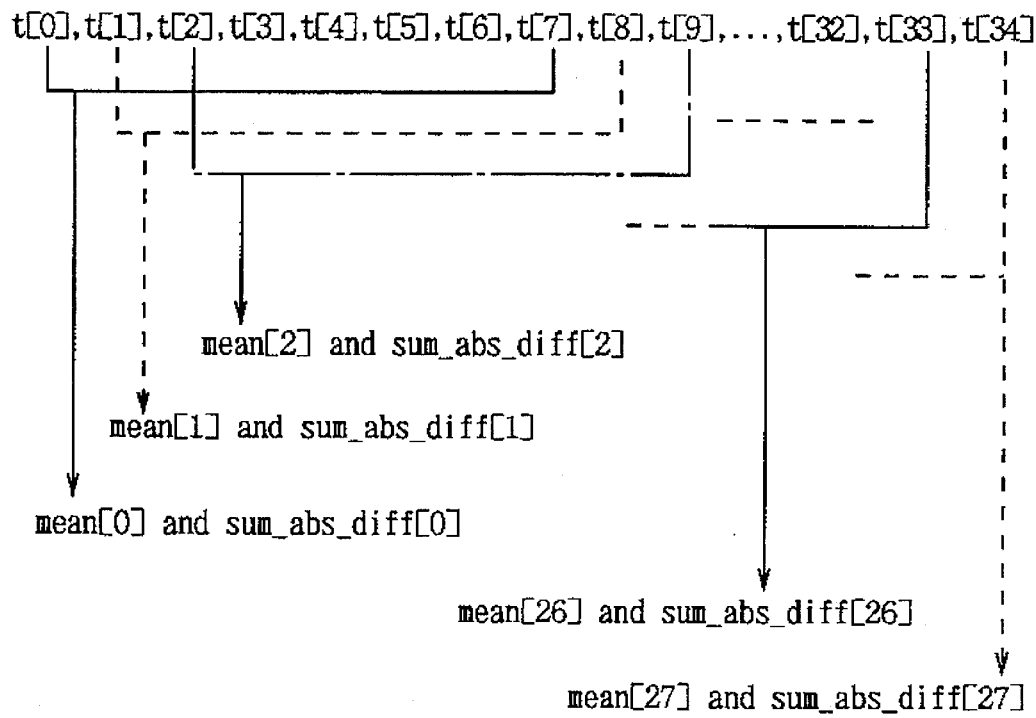
FIG. 23 is a schematic view showing memory data after processing.
Figure 23C:
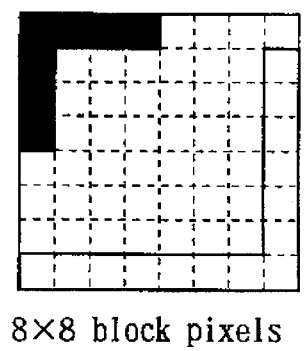

It is assumed that pixel values of a block consisting of 8 by 8 pixels are stored in array memory pixel positions x[ ] in the order of numbers shown in FIG. 22(A). The typical values of the block are estimated from 28 pixels shown in FIG. 22(B). These pixel values are taken out from the positions x[ ] in the order shown by arrow in FIG. 22(C) (numbers indicating the order) and stored in an array memories t[ ] as shown in FIG. 23(A).

The typical values of the block are calculated with a DCT/NTC judging algorithm shown in FIGS. 24 to 28. FIGS. 24 to 28 shown the accurate definition of the algorithm in C language.

First, a differentiating process is executed between adjacent samples on the array memories t[ ] to obtain differential value data of the array memory t[ ], and flat area estimation is effected according to this data. The flattest area is defined to be one, in which the summation of the absolute values of 8 continuous differential values of the array memories t[ ] is smallest. A typical value of the block is defined to be the mean value of the values in 8 array memories t[ ] in the flattest area. This value is referred to as "BASE1", and the summation of the absolute values of the differential values in array memories t[ ] in this area is referred to as "sum_abs diff1".

Figure 29A:
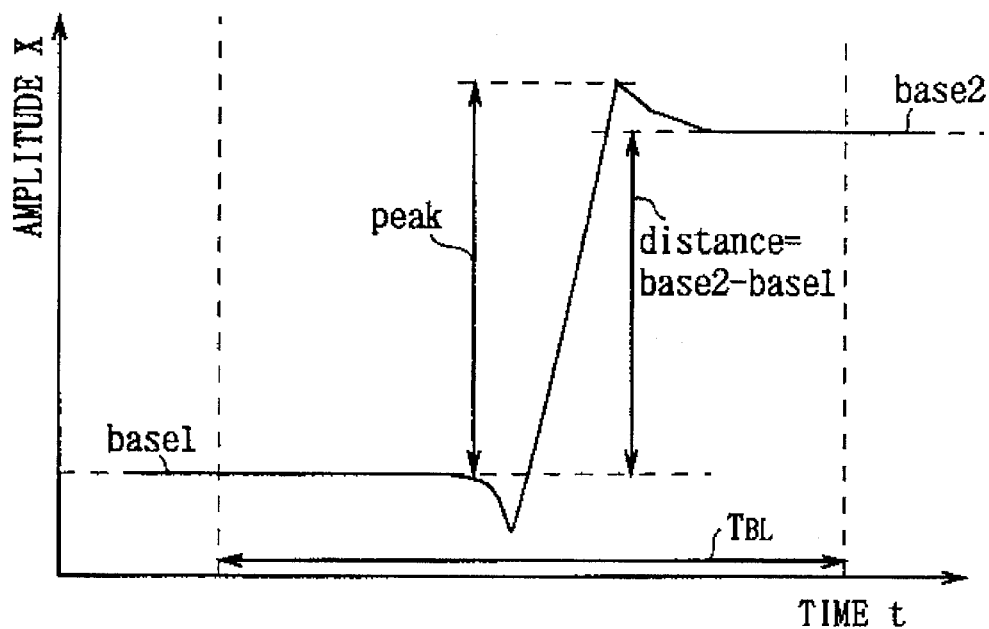
FIG. 29 is a signal waveform diagram showing an example of block picture signal including contour.
Figure 29B:
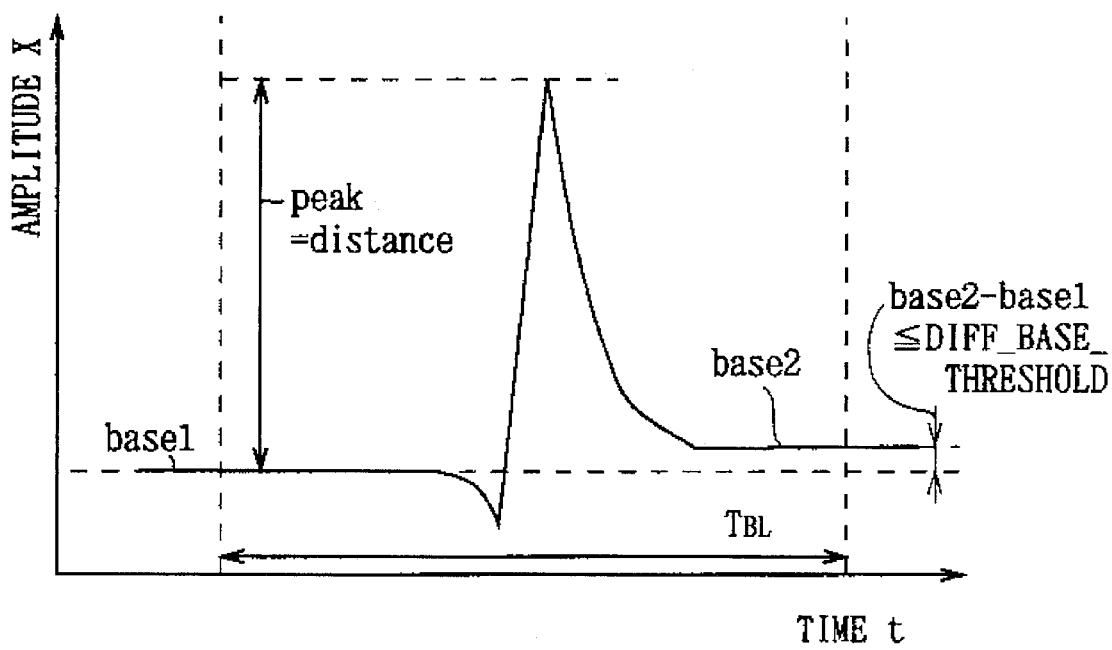

In steps SP12 and SP13, the coding method switching judgment unit 3 judges whether the pertinent block has at least one of the following states. If the block has at least one such state, it is discrete cosine transform coded.
(a) peak<PEAK_THRESHOLD Peak is the value as shown in FIG. 29, and its accurate definition is shown in FIG. 26.

The PEAK_THRESHOLD is a threshold value given by the coder.
(b) BASE1 being ineffective More specifically, sum_abs_diff1>FLAT_SAD_THRESHOLD is a threshold value given by the coder.

Subsequently, the coding method switching judgment unit 3 executes a step SP14 in FIG. 20 to search the other typical value BASE2 of the block in a method shown in FIG. 25. The typical value "BASE2" is searched in an area on the opposite side of the area, in which the typical value BASE1 is detected (see in FIG. 23(B)). The typical value BASE2 is calculated in the same manner as for the typical value BASE1. The typical value BASE2 need not be present. If the block has at least one of the following states, the typical value BASE2 is invalid and not present.
(c) sum_abs_diff2>FLAT_SAD_THRESHOLD
(d) |BASE2_BASE1|≦DIFF_BASE_THRESHOLD The symbol "| |" here indicates the absolute value calculation.

DIFF_BASE_THRESHOLD is s threshold value given by the coder.

In subsequent steps SP15 and SP16 in FIG. 20, the coding method switching judgment unit 3 checks the size of the flat area.

In this routine, unit 3 checks whether the flat area in the pertinent block is large or not. FIGS. 27 and 28 show the accurate definition of the algorithm in C language.

First, the absolute value "diff_base1" of difference signal between each pixel value (x) in the block and BASE1 is calculated.

Then, the number of pixels, in which diff_base1 is no greater than threshold value "DIFF_BASE_THRESHOLD", is calculated to obtain "count_base1_pixel". If the typical value BASE2 is present, the same calculation is done with respect to the typical value BASE2 to obtain "count_base2_pixel". If the sum of count_base1_pixel and count_base2_pixel is not greater than threshold value "COUNT_FLAT_PIXEL_THRESHOLD", a YES result yields in a step SP16. In this case, the coding method switching judgment unit 3 thus selects the discrete cosine transform system for coding this block.

If a NO result yields in the step SP16, on the other hand, in a step SP17 the coding method switching judgment unit 3 ends the pertinent edge block detection sub-routine RT2 and returns to the coding system selection routine RT1 in FIG. 19.

At this time, the coding method switching judgment unit 3 executes the steps SP4 through SP7 to select the intra-block predictive coding (NTC) system for coding.

When the intra-block predictive coding (NTC) system is thus selected for coding, if count_base1_pixel and count_base2_pixel, the typical values BASE1 and BASE2 are interchanged.

Meanwhile, if the block (i.e., macro-block) to be coded is an intra-frame signal coded macro-block, the typical value BASE1 is transmitted as intra-block predictive value (corresponding to the DC value in the discrete cosine transform (DCT) coding.

If the macro-block to be coded is an inter-frame signal coded (or non-intra-frame coded) macro-block, the typical value BASE1 is fixed to zero and not transmitted. Alternatively, it is possible to transmit the typical value BASE1 even if the macro-block to be coded is a non-intra-frame coded macro-block. Thus, if the absolute value of the typical value BASE1 is greater than the threshold value "DIFF_BASE_THRESHOLD", the discrete cosine transform (DCT) coding is selected for coding the block.

Threshold values BASE_DISTANCE_ERR, DIFF_BASE_THRESHOLD, FLAT_SAD_THRESHOLD, PEAK_THRESHOLD, BASE_DISTANCE_THRESHOLD and COUNT_FLAT_PIXEL_THRESHOLD are adequately set in dependence on the compression factor and pattern deterioration.

In the calculation of the typical values of block, the typical value "BASE1" obtained in the series of edge block detection processes executed in the step SP3, for instance, is adapted as typical value "BASE" of block. In addition, if the typical value "BASE2" is present, it is used as typical value "BASE'" of block. If the typical value "BASE2" is not present, as the typical value "BASE'" of block is used an intra-block sample value, which corresponds to the greatest absolute value of the difference between the typical value and intra-block sample value.

Instead of such method of calculation, it is possible to use the mean or smallest intra-block sample value as the typical value.
(5) Variable Length Coding The variable length coding (VLC) unit 6 variable length codes the transmission management signal S7, which is constituted by discrete cosine transform (DCT) coding/intra-block predictive coding (NTC) switching information, the typical value BASE of block used for intra-block predictive coding (NTC) and quantizing width Q (or the typical value of block, difference between the typical value BASE and the other typical value BASE' of block and quantizing value Q), the order of intra-block sample scanning and the switching information as to whether the differentiating process is to be executed, along with motion picture data to be transmitted in the following way.

In the block-by-block discrete cosine transform (DCT) coding, a macro-block is formed with a plurality of coded blocks adjacent to one another as a group, and a single coding method is used for the transmission of the macro-block.

Particularly, in this embodiment for the switching of the method of intra-macro-block motion picture data coding the switching information and additional information for the intra-block predictive coding (NTC) are added, as well be described below in detail.

The following information is used for the macro-block coding.

First coding information is macro-block type (macroblock_type). This information concerns whether contents of VLC coded representing the macro-block coding method include macro-block quantizing scale, information as to whether the macro-block is of the intra- or inter-frame coding mode, prediction mode in the inter-frame coding mode, macro-block motion predictive vector and intra-block predictive coding (NTC) of blocks constituting a macro-block.

Second coding information is macro-block quantizing scale (Quantize_scale). With blocks constituting macro-blocks constituted by VLC codes representing macro-block quantizing scale values, this quantizing scale is basically used to quantize discrete cosine transform (DCT) coefficients or picture signal. For blocks to be intra-block non-transform coded, it is possible to use a block quantizing scale to be described later.

Third coding information is macro-block motion predictive vector (Motion_vector). This information is a VLC code representing a motion predictive vector value in case when the macro-block is of the inter-frame coding mode.

Fourth coding information is a coded block pattern (Coded_block_pattern). This information is a VLC code representing the position of a block among blocks constituting a macro-block, in which has discrete cosine transform (DCT) coefficients or picture coefficients to be transmitted. It is not present when the macro-block is of the intra-frame coding mode.

Fifth coding information is DCT/NTC switching information. When the coding of block includes the intra-block predictive coding (NTC), the information consists of a VLC code representing the position of a block, for which NTC is selected. It is not present when the discrete cosine transform (DCT) coding is selected for all the blocks.

FIG. 30 shows a case, in which each macro-block consists of 4 blocks. In this case, a macro-block of the intra-frame coding mode is represented by a 4-bit code, each bit representing coding system switching information with respect to each block constituting the macro-block.

Likewise, an intra-frame coding mode macro-block may be represented with a 4-bit code. Alternatively, it may be represented with a code having a length equal to the number of blocks, in which coefficient judged from the "coded block pattern" noted above is present (FIG. 30).

When each bit is "0", it represents the discrete cosine transform (DCT). When it is "1", it represents the intra-block predictive coding (NTC).

This information may be replaced with a Huffman variable length code or the like.

In FIG. 30, MB means a macro-block, which consists of 4 blocks. If the 0th macro-block MB No. 0 is of the intra-frame coding mode and also if the content of the block $Y_{00}$ is that "there is no coefficient of discrete cosine transform (DCT) coding", the content of the block $Y_{01}$ is that "there is coefficient of the intra-block predictive coding (NTC)", the content of the block $Y_{02}$ is that "there is coefficient of intra-block predictive coding (NTC) and the content of the block $Y_{03}$ is that "there is coefficient of discrete cosine transform (DCT) coding", the "discrete cosine transform (DCT) coding/intra-block predictive coding (NTC) switching information" can be represented by 3-bit data "001".

Block coding information is as follows.

First block coding information is additional information for the intra-block predictive coding. This information is present in case of a block, in which the following three codes (a) to (c) are coded by the intra-block predictive coding (NTC).
(a) Data scan path type
This code represents the type of the selected data scan path. For example, when the four different paths DSP1 to DSP4 as noted above in connection with FIG. 14 are prepared, the selected path Can be represented by using a 2-bit code.

(b) Flag as to whether differentiation is to be executed
This flag concerns whether a differentiating process is to be executed after the scan conversion. It is a one-bit on-off data.
(c) Block Quantizing scale
This code is a VLC code concerning the block quantizing scale value. It is unnecessary in case the block quantizing scale is fixed to the "macro-block quantizing scale" noted above or to a value obtained by substituting the "macro-block quantizing scale" into a certain equation.

For example, it may be unnecessary with a motion picture coding system, in which the discrete cosine transform coding and intra-block predictive coding are adaptively switched for each block to be coded, while transmitting block discrete transform coding/intra-block predictive coding switching information, and also in which for the intra-block predictive coding two typical values BASE and BASE' of block are obtained to transmit BASE, difference between BASE and BASE' and quantizing width for adaptive quantizing. Otherwise, the value of the block quantizing scale may be represented by a code of a fixed length, for instance about 7 bits. Alternatively, the difference of the scale from the "macro-block quantizing scale" noted above may be expressed by variable length coding it.

Second block coding information is an intra-block typical value and consists of a VLC code concerning therewith. This code is unnecessary in case when the intra-block typical value is fixed to "0". Otherwise, the intra-block typical value (which is a DC coefficient in case of the discrete cosine transform coding and BASE in case of the intra-block predictive coding) may be represented by a fixed length code of 8 bits, for instance. Alternatively, it is possible to execute a differentiating process on block typical values in an order as shown by arrow in FIG. 31 and variable length code the obtained differentiated values.

Third block coding information is the difference between two intra-block typical values. In a motion picture coding system, in which the discrete cosine transform coding and intra-block predictive coding are adaptively switched for each block to be coded, while transmitting block discrete cosine transform intra-block predictive coding switching information, and also in which for the intra-block predictive coding the two typical values BASE and BASE' of block are obtained to transmit BASE, difference value between BASE and BASE' and quantizing width for adaptive quantizing, for the intra-block predictive coding the difference between the two typical values BASE and BASE' of block is transmitted with a fixed length of 8 bits, for instance.

Fourth block coding information is coefficient data (picture data). This data is obtained by converting scan-converted one-dimensional data into VLC codes. It is transmitted by two-dimensional Huffman coding, for instance. In this case, for a coefficient having a value other than "0" this value and relative position of the coefficient are set to form a variable length code for transmission.

The discrete cosine transform and intra-block predictive coded signals have different statistical characters. Accordingly, reference tables for two-dimensional Huffman coding may be prepared for both of the signals and used according to the discrete cosine transform coding/intra-block predictive coding switching signal. By so doing, the coding efficiency can be further increased.
(6) Decoding System
In the decoding system DV2, as shown in FIG. 2, the coded bit stream input is temporarily stored in the buffer 31. Then, the inverse variable length coding (inverse VLC) unit 32 decodes the DCT/NTC switching signal from the stored coded bit stream and selects either DCT or NTC for each block according to the decoded information.

The delay circuit 33 is provided for timing adjustment with respect to the NTC processing. The first inverse quantizer 34 and inverse discrete cosine transform (DCT) circuit 35 have complementary structures to those of the corresponding elements in the discrete cosine coding unit 1 noted above.

Figure 32:
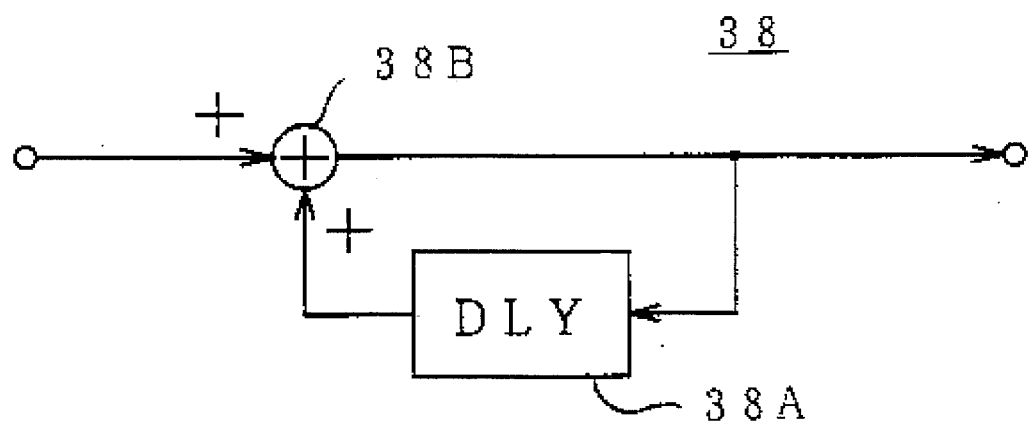
FIG. 32 is a connection diagram showing an inverse differential coding unit.

Likewise, the inverse differentiater 38 (which includes a one process period delay circuit 38A and an adder 38B as shown in FIG. 32), inverse scan converter 37, second inverse quantizer 38 and inverse intra-block predictor 39 have complementary structure to those of the corresponding elements in the intra-block predictive coding unit 2.

The predictor 5 restores original picture from the output of the inverse DCT circuit 35 or inverse intra-block predictor 39 that has been obtained by processing for each block.

Industrial Applicability

As has been described in the foregoing, the motion picture coding/decoding system according to the present invention permits sufficiently high data compression, and thus it can be suitably used for the transmission of motion picture signal through a transmitting system with limited data transfer speed such as television telephone systems and video recording and reproducing systems.

We claim:

1. In a method of compressing a motion picture signal divided into a plurality of blocks of digital picture data representing respective pixels, and in which each of said blocks of digital picture data is selectively compressed by a discrete cosine transform (DCT) coding method or by an intra-block predictive coding method which effects non-transform coding (NTC), said intra-block predictive coding method comprising the steps of:

calculating a mean value of said picture data in at least one flat region within each block;

determining a representation value of each said block on the basis of said mean value thereof;

determining differences between said representation value for each block and values of said picture data representing the pixels within said block so as to generate difference values;

quantizing said difference values with a selected quantizing width so as to generate quantization coefficients;

variable length coding said quantization coefficients, said representation value and information representing said quantizing width;

adaptive scanning said quantization coefficients in accordance with a distribution status of said quantization coefficients within each block so as to convert said quantization coefficients into one-dimensional information;

coding information indicating a scanning sequence of said adaptive scanning;

selectively executing a differential processing of said one-dimensional information; and coding switching information indicating whether or not said differential processing has been executed.

2. The method according to claim 1, wherein said mean value is composed of a first mean value corresponding to a first portion of said flat region of said block and a second mean value corresponding to a second portion of said flat region apart from said first portion of said flat region; and further comprising the step of varying said quantizing width for each block on the basis of said first and second mean values thereof.

3. The method according to claim 1, wherein said mean value is composed of a first mean value corresponding to a first portion of said flat region of said block and a second mean value corresponding to a second portion of said flat region of the block apart from said first portion; and further comprising the step of coding a difference between said first mean value and said second mean value of said block.

4. A method for decoding a bit stream of non-transform coded motion picture data which represent variable length coded quantization coefficients for respective blocks of the motion picture data, representation values determined on the basis of mean values of flat regions in said respective blocks, information indicating whether or not said quantization coefficients have been subjected to differential processing, and quantization width information as to quantizing widths employed for said respective blocks, said method comprising the steps of:

variable length decoding said bit stream to generate said quantization coefficients, said representation values determined on the basis of said mean values of flat regions within said respective blocks, and said quantization width information as to quantizing widths;

decoding the generated quantization coefficients on the basis of said representation values and said quantization width information as to said quantizing widths;

decoding, from said bit stream, said information indicating whether or not said quantization coefficients have been subjected to said differential processing; and executing adaptive inverse differential processing of the decoded quantization coefficients on the basis of said decoded information indicating said differential processing.

5. The method according to claim 4, wherein said bit stream of non-transform coded motion picture data further includes information indicating a scanning sequence employed in an adaptive scanning of said quantization coefficients; and further comprising the steps of:

decoding, from said bit stream, said information indicating the scanning sequence employed in said adaptive scanning of said quantization coefficients; and adaptive scanning said quantization coefficients on the basis of the decoded information indicating said scanning sequence.

* * * * *